United States Patent [19]

Yang et al.

[11] Patent Number: 5,280,582
[45] Date of Patent: Jan. 18, 1994

[54] NO-OWNER FRAME AND MULTIPLE TOKEN REMOVAL MECHANISM FOR TOKEN RING NETWORKS

[75] Inventors: Henry Yang, Andover; K. K. Ramakrishnan, Maynard; Anthony Lauck, Wellesley, all of Mass.

[73] Assignee: Digital Equipment Corporation, Maynard, Mass.

[21] Appl. No.: 17,956

[22] Filed: Feb. 16, 1993

Related U.S. Application Data

[63] Continuation of Ser. No. 400,072, Aug. 29, 1989, abandoned.

[51] Int. Cl.$^5$ .............................................. G06F 15/16
[52] U.S. Cl. .............................. 395/200; 364/DIG. 1; 364/241.8; 364/242.94
[58] Field of Search ................ 395/200; 364/DIG. 1, 241.8, 242.94

[56] References Cited

U.S. PATENT DOCUMENTS

| 4,468,734 | 8/1984 | Lanier et al. | 364/200 |
| 4,646,232 | 2/1987 | Chang et al. | 364/200 |
| 5,053,946 | 10/1991 | Jain | 364/200 |

Primary Examiner—Gareth D. Shaw
Assistant Examiner—A. Katbab
Attorney, Agent, or Firm—A. Sidney Johnston; Barry N. Young; Albert P. Cefalo

[57] ABSTRACT

A ring purging station for a token-ring network is disclosed. The station performs purging operations to remove no-owner frames and frame remnants from the network. The station begins a purging operation by detecting the token on the network and removing it. The station then begins stripping all frames and remnants of frames that it receives from the network, and transits one or more purge marker frames. When the station detects one of the one or more purge marker frames it transmitted, it ends the purging operation, and releases the token back onto the ring. In this way no-owner frames and frame fragments are removed from the network, while the ring is otherwise normally operating. In an embodiment of the invention, a sequence number is associated with each purging operation, included in the purge marker frame(s), and verified upon receipt of the purge marker frame(s). The station also corrects multiple token conditions when a multiple token condition is detected during a purging operation. A further aspect of the invention is an election method for selecting a purging station from the stations on the ring.

54 Claims, 11 Drawing Sheets

NO-OWNER FRAME AND MULTIPLE TOKEN REMOVAL MECHANISM FOR TOKEN RING NETWORKS

This is a continuation of copending application Ser. No. 07/400,072 filed on Aug. 29, 1989, now abandoned.

Related Applications

A related pending U.S. patent application is U.S. patent application Ser. No. 07/884,321, of Yang, et al, filed May 11, 1992, entitled: FRAME REMOVAL MECHANISM FOR TOKEN RING NETWORKS, which is a continuation of U.S. patent application Ser. No. 07/678,888 filed on Mar. 28, 1991, now abandoned; which is a continuation of U.S. patent application Ser. No. 07/577,828 filed on Sep. 4, 1990, now abandoned; which is a continuation of U.S. patent application Ser. No. 07/483,296 filed on Feb. 20, 1990, now abandoned; which is a continuation of U.S. patent application Ser. No. 07/231,773 filed on Aug. 12, 1988, now abandoned.

BACKGROUND OF THE INVENTION

Field of the Invention

The invention relates generally to the field of computer networks comprising a plurality of stations which communicate data in a ring using a token-based protocol and more specifically to a mechanism for removing extraneous or erroneous data or ring control information from the network.

Description of the Prior Art

A computer network enables various devices, such as processors, mass storage devices, and printers, to communicate with each other over high speed communication links. The devices are connected, that is, coupled, to the network, and thus transfer data to and from the network through stations. The stations are interconnected by the communication links.

One example of such a network is a Local Area Network (LAN). A LAN allows high-bandwidth communication among devices within a limited geographic area. The communication links are typically composed of fiber optics, coaxial cable or twisted conductor pairs.

LAN's may be configured as rings, with network stations transmitting data in one direction around the ring. Thus when a station transmits data onto the ring, the data travels around the ring from station to station, with each station receiving the data from the preceding station and repeating it to the succeeding station, until the data reaches the station that is to receive it. In a well-known ring network the receiving, or destination, station also repeats the data to its downstream successor and the data thus continues around the ring to the originating, or source, station.

The stations operate in accordance with communication protocols which facilitate the orderly transfer of data over the communication links. One type of communication protocol is a token-ring system. Such systems use a token, that is, a specific string of bits, to indicate that a transmitting station has completed its transmission. A succeeding station may then, following the dictates of the protocol, begin transmitting data upon receipt of the token.

In a token-ring system a station may not transmit data over the ring unless it actually holds the token. Thus if a station has data to transmit around the ring, it removes the token from the ring data stream, that is, it "captures" the token, when it receives it from the preceding station. The capturing station then begins its data transmission. When the station is finished with the data transmission it retransmits the token, effectively releasing it. The succeeding stations thereafter transfer the token around the ring until a station captures it in order to make another transmission.

Network stations transmit and receive data in the form of frames. The frames contain, in addition to the data, addresses, an error detection sequence and status flags, for example, a flag indicating receipt of the frame by the intended receiving, or destination, station. The frame addresses identify the source station and destination station or stations.

Every station and every attached device is identified by a unique address. Thus each station has associated with it its unique station-address and the addresses of its attached devices. The stations may have other addresses, for example, logical addresses, associated with them, also. A frame directed from a source station to a single destination station thus contains the address of the source station and, for example, the address of a specific device attached to the destination station. Each station may maintain a list of its associated addresses, such that the station receives the frames containing any one of its addresses.

A destination station, in addition to repeating the frame to its succeeding station, copies the frame for use by the appropriate device(s) associated with the station. The destination station may also set the applicable status flags indicating receipt of the frame.

When the frame has returned to the source station, the station, recognizing the frame as its own, for example, by recognizing the source address in the frame as its own, removes, or strips, the frame from the ring data stream. After a transmission, the first frames received by the source station over the ring are the frames it transmitted, assuming proper operation of the stations on the ring.

Frames may be altered as they travel around the ring. The alteration may affect the source addresses in a number of frames, rendering them unrecognizable to the source stations. The source stations will not then strip the frames, and these frames will travel continuously around the ring. Thus a station listed as a destination station will repeatedly receive and process the frames. The processing will ordinarily detect the duplication, but it does require the use of station resources that might conflict with or delay other operations of the station.

A similar situation occurs when a station which has transmitted frames on to the ring becomes inoperative before it strips the transmitted frames. These frames, like the frames with altered source addresses, continuously travel around the ring because none of the stations then operating on the ring recognize the frames as their own and strip them. Accordingly, these frames, the altered-address frames and any other frames continuously traversing the ring are commonly referred to as "no-owner" frames. No-owner frames needlessly take up ring bandwidth by continuously traveling around the ring. These frames may also cause processing backlogs in the destination stations because the stations must process them each time they receive them. The no-owner frames often require frequent and fast processing because they return to the destination stations in the time it takes the frames to traverse the ring, which is typically faster than frames are ordinarily received. Thus it is desirable to rid the ring of no-owner frames.

A mechanism to purge no-owner frames from rings operating under the IEEE 802.5 standard protocol involves stripping all data from the ring, and then re-initializing the ring. Re-initializing the ring causes it to perform all actions necessary to re-start the ring and make it operational. For example, the initialization includes a claim token operation and the creation of a new token. The claim token operation involves an arbitration process during which the winner of the arbitration, also called the claim token winner, creates the new token. Ring re-initialization may take a considerable period of time and result in lost performance during this period. Thus, for performance considerations, ring re-initializations should be performed as infrequently as possible.

To detect a no-owner frame, that is, to determine when a ring re-initialization is necessary, a station, referred to in the IEEE 802.5 standard protocol as an Active Monitor, places a marker at the beginning of each frame it repeats over the ring. If the Active Monitor thereafter detects a frame containing a marker, indicating that the frame traveled completely around the ring without being stripped, it begins a purge operation which includes a ring re-initialization. The marker is not protected by the frame error detection sequence. Thus an error in the marker may either start a purging operation unnecessarily or prevent one from occurring.

A purge operation begins with the Active Monitor placing a purge frame on the ring and then stripping everything off the ring that it receives. The Active Monitor may transmit multiple purge frames or it may transmit idle frames to fill the ring while it continues stripping everything, including the token, from the ring. When the Active Monitor receives one of its purge frames, indicating that it has essentially filled the ring with the purge or idle frames, it re-initializes the ring and issues a new token. Thus each purge operation causes the loss of all data then on the ring. There is a need for an improved purge mechanism which minimizes the loss of data on the ring and which does not require ring re-initialization and/or ring operation interruption.

The purge operation described above may be used only with ring protocols which allow markers to be placed at the beginning of a frame, for example, the IEEE 802.5 protocol. At the present time, protocols such as the ANSI Fiber Distributed Data Interface (FDDI) protocol which do not allow frame markers at the start of frames do not have any mechanism to handle no-owner frames. Thus a purge mechanism which may be used with any token-ring protocol and/or frame format is desirable.

Every time a ring is initialized, a station must be designated as the ring purging station. If the ring is operating according to the IEEE 802.5 protocol the same station, i.e., the Active Monitor, is designated the ring purger after each ring initialization. If the Active Monitor station later fails or is otherwise removed from the ring, the ring must operate without a ring purger until after the ring is initialized. Thus there is a need for an improved mechanism to select a ring purging station. The mechanism should operate after each ring initialization. It should also operate between initializations whenever a previously operating ring purger becomes inoperative.

Token rings may occasionally experience an error condition in which multiple tokens are simultaneously traveling around the ring. This condition may result in multiple stations simultaneously transmitting data onto the ring. If a station which is transmitting receives data frames over the ring, it removes them. Thus data frames transmitted by one station may be removed by a second transmitting station. If the frames are removed before they reach the intended destination, ring operations may be disrupted and data may be lost. Normal operations of the ring may correct the multiple token condition, for example, the second token may be removed by a transmitting station. However, if the multiple token error condition persists, other protocol operations may also be affected, and ring operations may be significantly disrupted. Neither the IEEE 802.5 protocol nor the ANSI FDDI protocol has any mechanism for the detection of a multiple token error condition. Thus the condition will go unchecked until the amount of data which is lost disrupts the operation of the ring enough to cause a ring initialization. Accordingly, there is a need for a mechanism which deterministically detects multiple tokens on the ring.

SUMMARY OF THE INVENTION

One aspect of the invention is a new and improved station and a method for enabling the station to purge the ring of no-owner frames. Another aspect of the invention comprises various methods for enabling the station to detect and possibly correct a multiple token error condition. A third aspect of the invention comprises various methods for selecting a station to operate as the ring purger.

In summary, a station designated as a "purging station" places one or more "purge marker" frames on the ring each time it receives a token. If the purging station has data to transmit, it transmits the data first, and then the purge marker frames. Next the purging station transmits the token. Thereafter, the purging station purges or strips from the ring everything it receives, except possibly purge marker frames from another purging station. When the station receives one of its own purge marker frames, it stops stripping the information. The period during which a purging station continuously strips all received frames from the ring, beginning with the receipt of a token and ending with the receipt of one of its purge marker frames, is referred to as one "purge operation." Frames which have not been stripped by another station, in particular, no-owner frames, are stripped during a purge operation, while the ring is otherwise normally operating.

As a second aspect of the invention, the purging station operates using one of two methods for detecting and possibly correcting a multiple token error condition. Using a first method, the purging station detects a multiple token error condition if it receives a token, during a purge operation, before it receives at least one of its purge marker frames. If the ring is functioning properly, the station receives first over the ring any data frames it transmitted, and then its purge marker frame(s). Eventually, it receives the token, after receiving any data frames transmitted by other stations. Thus, receipt of the token before the purge marker frame(s) indicates an error.

After detecting the error condition, the station may: (1) continue its purging operation until it receives an appropriate purge marker frame; (2) immediate re-initialize the ring to correct the error condition; or, preferably, (3) stop its current purging operation and increment a multiple token error condition count. When the count reaches a predetermined number, indicating that normal ring operations have not corrected the condition, the station causes a ring initialization to rid the ring of the multiple tokens.

Using a second, preferred method, the station includes in each of its purge marker frames a sequence number associated with the start of a new purge operation. The purging station increments its sequence number at the beginning of a purge operation, that is, when it receives a token. The station then includes the incremented number in each of the purge marker frames it transmits. The station stores, for future reference, the sequence number included in these purge marker frames.

When the station later receives a purge marker frame it compares the sequence number in the received frame with the stored sequence number, that is, the sequence number of the current purge operation. If the sequence numbers match, the station ends its purge operation. If the sequence numbers do not match, the station detects a multiple token error condition. If the station receives a token before it receives one of its purge marker frames, it detects a multiple token error condition, also. Upon detecting a multiple token error condition the station may, as set forth above, continue its purging operation until it receives an appropriate purge marker frame, i.e., a purge marker frame containing the appropriate sequence number, start a ring re-initialization, or stop its current purging operation and increment its multiple token error condition count.

A third aspect of the current invention is a method for selecting a purging station from the stations operating on the ring. The purging station is selected each time the ring is initialized and, also, each time a previously operating ring purger becomes inoperative. The invention comprises a first and a second selection mechanism.

Using the first mechanism, each properly functioning station becomes a purging station and periodically places on the ring a "purger hello" frame which contains its station address as the source address. Each of the stations then operates as a purging station until it receives a purger hello frame containing a source address which is numerically smaller than its own address. Upon receipt of this frame, the station becomes a non-purging station, and thus, it no longer transmits purger hello frames or performs purging operations. The stations which have not received such frames continue their purging operations and continue to send periodically their purger hello frames. Eventually, the station with the smallest address is the only station performing purging operations and is the only station sending purger hello frames. This station then operates as the ring purger.

Each non-purging station sets a timer to time the arrival of a purger hello frame containing an address which is smaller than its own. If such a purger hello frame is not received before the timer expires the non-purging station again becomes a purging station. The station thus issues its own purger hello frames and performs its own purging operations. The station then continues to operate as a purging station until it receives a purger hello frame containing a smaller station address.

Using a second, preferred mechanism which is particularly suited for selecting, a ring purger after a ring initialization, the station which previously operated as the purging station, i.e., before the ring initialization, operates as the ring purging station until the purging station selection procedure is completed. Thus this station periodically sends purger hello frames. The other stations operate as "candidate purging" stations, and thus, they transmit "candidate hello" frames. A candidate purging station may perform a purge operation which includes sending purge marker frames; however, the candidate station does not send purger hello frames.

If a candidate purging station receives a purge marker frame from another station, it stops performing purge operations, regardless of the address contained in the frame. The station continues to transmit candidate hello frames however, and operates as a candidate-non-purging station. Thus it continues to participate in the election.

If a candidate station, that is, a candidate-purging station or a candidate non-purging station, receives a candidate hello frame containing an address which is smaller than its own or any purger hello frame, it becomes a non-candidate (non-purging) station and it stops sending candidate hello frames. If a candidate non-purging station or a candidate-purging station has not received a candidate hello frame containing a smaller address or a purger hello frame within a predetermined time, for example, before an election timer expires, it becomes a ring purging station and starts sending purger hello frames. The station then continues to operate as a ring purging station until it receives a purger hello frame containing a smaller address.

Each non-purging station sets a timer to time the arrival of a purger hello frame containing an address which is smaller than its own. If such a purger hello frame is not received before the timer expires the non-purging station initiates a new election process.

DETAILED DESCRIPTION OF AN ILLUSTRATIVE EMBODIMENT

1. Operation of a Conventional Token Ring

Figure 1:
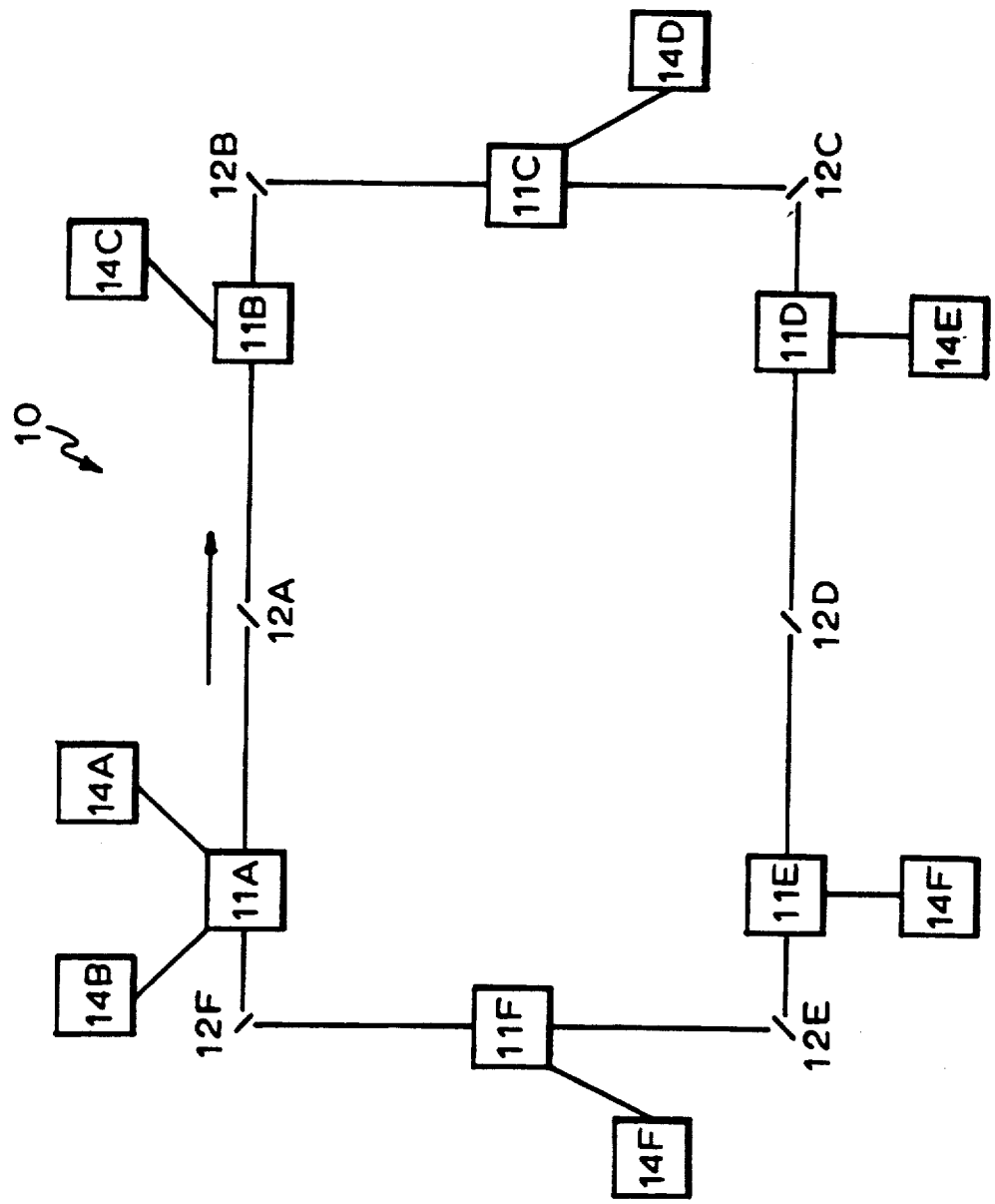
FIG. 1 depicts a functional block diagram of a token ring network.

With reference to FIG. 1, a token ring 10 includes a plurality of stations 11A through 11F connected by communication links 12A through 12F. The stations 11 couple one or more devices 14A through 14F to the ring. The devices 14 may be of diverse types, including data processors, mass storage devices, telecommunications links, printers, and so forth, all of which may transmit information to, or receive information from, other devices in the ring 10 over communication links 12.

The stations 11 transmit information over the communications links 12 in the form of frames, the structure of which will be described below in connection with FIG. 2. Communication between two stations on the ring occurs when, for example, one station 11 (e.g., 11A) transmits a frame to another station 11 (e.g., 11E). To accomplish this, the transmitting station 11A transmits a signal comprising a bit stream forming the frame to another station 11B (following the direction of the arrow) over the communications link 12A interconnecting the two stations. The station 11B that receives a bit stream from the transmitting station 11A repeats the frame over the communications link 12B which interconnects it and another station 11C.

This process is repeated by each of the other stations 11C–F until the frame is returned to the original transmitting station 11A. Essentially, each of the stations receives a signal over a communications link 12 interconnecting it and a preceding station 11, and transmits a signal over another communications link 12 interconnecting it and a succeeding station 11. If a station 11 is an intended recipient of the frame (e.g., 11E) in addition to repeating the frame to its downstream station 11, it also retains a copy of the frame for processing by one or more of the devices 14 connected to it.

The determination of whether a station 11 may transmit a frame to the ring is based on whether the station holds a token. A token is a special sequence of bits which the stations transmit around the ring to indicate the end of a previous transmission. If station 11 needs to send a frame, when the token reaches it, it does not repeat the token, thereby capturing the token and becoming its holder. The station 11 then transmits one or more frames. After completing the transmission of the frame(s), the station 11 resumes transmission of the token around the ring in accordance with the ring protocol. Other stations on the ring may then capture the token and transmit frames.

When a station 11 receives a frame which it originated, other than the token, it strips the frame from the ring 10. Thus a frame is transmitted around the ring, that is, repeated from station to station, only once. If the originating station does not strip one of its frames, the frame will continue to circulate around the ring. This causes the intended destination station to receive the frame over and over again. The time required for such a frame to circulate around the ring is generally much shorter than the average rate at which new frames arrive at a destination station. Thus the destination station receives this circulating frame at a faster rate than it ordinarily receives frames, and it must process these frames more quickly, also. This results in additional station processing overhead and possibly, station errors.

Figure 2:
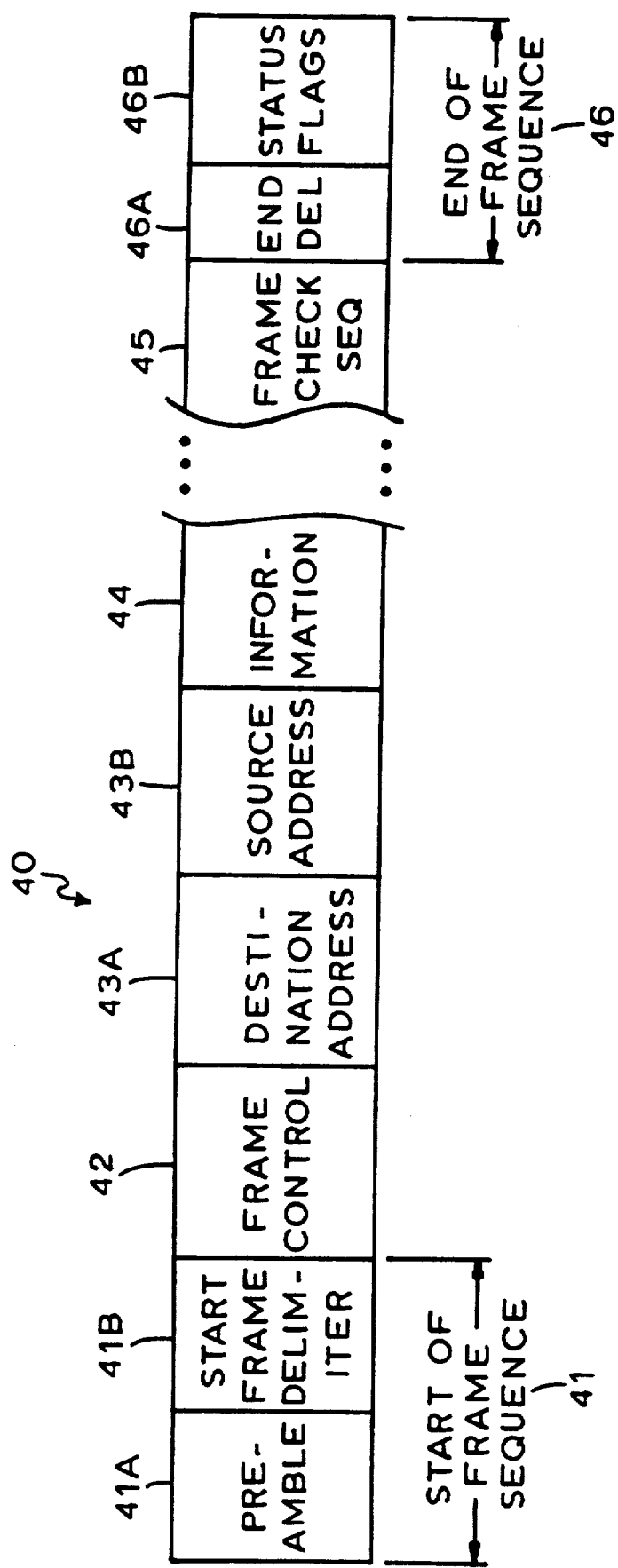
FIG. 2 is an illustration of an information frame used in the network shown in FIG. 1.

As noted above, information is transferred in the form of frames, the structure of which is shown in FIG. 2. With reference to FIG. 2, a frame 40 is divided into several fields. The start of a frame is denoted by a preamble field 41A and a start frame delimiter field 41B which further denotes the beginning of the portion of the frame containing the frame information. These fields are generally referred to as a start-of-frame-sequence 41.

Immediately following the start of frame sequence 41 is a frame control field 42 detailing whether the bit stream is a token or a frame and, if it is a frame, what type of frame it is. The possible types of frames include, for example, data frames (frames used to send a message from one station to another), claim token frames, beacon frames, purge marker frames, and void frames. The next two fields are address fields 43A–B, namely, a destination address field DA 43A whose contents identify the intended recipient(s) of the frame and a source address field SA 43B whose contents identify the source station. The information field 44 follows the address field 43, and is in turn followed by a frame check sequence field 45 containing an error detection sequence used by the receiving stations to detect errors in any of the frame control field 42, the address fields 43 and the information field 44.

The end of the frame is denoted by an end-of-frame sequence 46. The sequence 46 includes an end delimiter field 46A, which defines the end of a frame, and a frame status flag field 46B containing a set of status flags. The status flags are conditioned by stations other than the source station to provide status information to the source station. This information may include, for example, whether the frame was copied by the intended destination station(s), whether any errors have been detected, etc.

If a station 11 recognizes the contents of the frame destination address field 43A as one of its own addresses, that is, either its station-address or one of its other associated addresses, it copies the frame for processing by its attached device(s) 14. It also repeats the frame to the next station in the ring as set forth above.

When a frame returns to its source station, the station recognizes the contents of the frame source address field 43B as its own address, and strips (removes) the rest of the frame from the ring. When a frame is thus stripped, the start-of-frame sequence 41, the frame control field 42 and part of the address fields 43 remain. These fragments are ignored by the stations on the ring because they do not form a complete frame. They are stripped from the ring when they encounter a station in the act of transmitting or a purging station.

If the source address field 43B is altered as the frame travels around the ring, the source station may not recognize the frame as one of its own. Thus the source station will not strip it. The frame then travels around the ring, as a no-owner frame, requiring duplicative processing by the stations listed as destination stations. Similarly, if a source station becomes inoperative after transmitting frames, the frames are not recognized by any operating stations and thus the frames are not stripped. These frames also travel around the ring as no-owner frames requiring duplicative processing. To avoid such duplicative processing, a ring purging mechanism is utilized.

2. Purging Using Purge Marker Frames Without Sequence Numbers

The ring purging operation of the present invention is performed by one or more stations which are elected as ring purging stations after the ring is initialized. Preferably, only one station is elected as a purging station at any given time, as will be described below with reference to FIGS. 5 and 6. For this invention, a purging station performs purging operations only during normal operation of the ring, that is, only when there is a token on the ring and the ring is not undergoing an initialization. The stations respond only to error-free frames, that is, frames whose frame check sequences indicate that the contents of the frame have not been altered during transmission over the ring. As described in Sections 2-3 and 5-6 below, stations participating in purging and purger station selection operations transmit and receive hello frames. These frames include in the destination address field a group address, as defined in ANSI FDDI. Thus the stations in the group, that is, the stations participating in the purging and elections operations, may all receive the hello frames. The particular group address used in the hello frames is a pre-determined group address assigned to such frames by a ring implementor.

The purging stations discussed below transmit frames and tokens, and receive and strip frames and tokens using conventional circuitry. Each station performs these tasks following the operating protocol of the ring. For example, a station on a ring following the ANSI FDDI protocol includes circuitry to transmit, receive and strip frames and tokens according to the ANSI FDDI Token Ring Media Access Control (MAC) Specification ANSI X3.139-1987. During a purge operation, the stations may perform conventional stripping operations and strip received frames after examining the frame source address or they may strip all information from the ring as discussed below.

Figure 3:
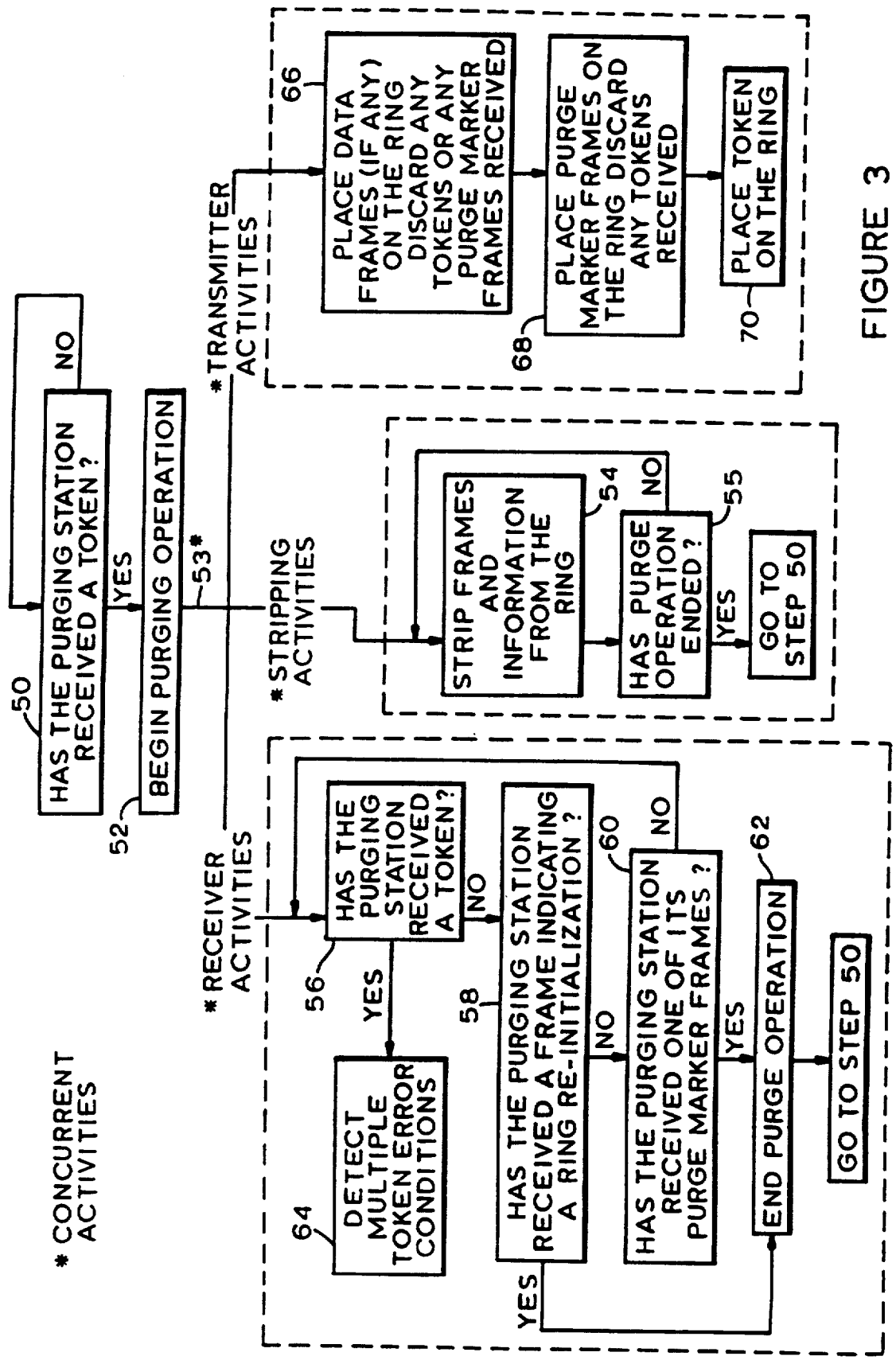
FIG. 3 is a flow chart depicting the operation of stations functioning as purging stations and multiple token detecting/correcting stations in accordance with a first embodiment of the invention that does not use sequence numbers in the purge marker frames.

FIG. 3 is a flow chart of the purging operation of a station operating in accordance with a first embodiment of the invention. This embodiment does not employ sequence numbers in the purge marker frames.

A purging station begins a purge operation when it receives a token (steps 50-52). Thus it begins stripping from the ring frames and other information it receives. At the same time, the station transmits in order: (i) any data frames it has to transmit, (ii) one or more of its purge marker frames as discussed in more detail below, and (iii) the token (steps 66-70). As indicated by arrow 53, the purging station concurrently performs transmitting, stripping and receiving operations. The station does not differentiate between various types of tokens or prioritized tokens which may be present on the ring, and thus, it performs a purging operation whenever it receives any token.

The station continues its purge operation until it receives one of its purge marker frames (steps 56-62 or until it receives a token or a frame indicating a ring initialization, either of which is received if the ring is operating abnormally. The receipt of a purge marker frame indicates to the purging station where in the ring data stream it began purging and thus where it should stop purging.

A purge marker frame contains information identifying it as a purge marker frame, for example, a specific frame-type code in the frame control field 42 (FIG. 2), as well as information which identifies the purging station, for example, the station address number in its source address field 43B (FIG. 2). The purge marker frame preferably contains an error detection sequence, also. Including the error detection sequence in the frame ensures that the station does not mistake a purge marker frame from another station as one of its own due to an error in the frame and also to reduce the probability that the station incorrectly interprets other frames as purge marker frames due to errors. Redundant purge marker frames are typically transmitted to avoid compromising a purge operation due to errors in a single purge marker frame. Preferably, the purging station transmits two purge marker frames.

Referring again to FIG. 3, while the purge operation is continuing, the purging station strips from the ring everything it receives. It may leave on the ring purge marker frames containing the address of another station, as discussed below.

Following the ANSI FDDI standard protocol, a station which is operating normally repeats all frames received from the ring except frames which it originally transmitted. Thus, it repeats the starting delimiter field 41B, frame control field 42, destination address field 43A and source address field 43B (FIG. 2) of all frames, and if the source address field 43B contains the station's address it strips the remainder of the frame instead of repeating it. A station performing a purge operation using a first option, may also repeat the portions of received frames up to the source address field 43B and strip the rest of the frame as described above. This enables the purging station to selectively strip or not strip purge marker frames containing the address of another station.

Using a preferred second option, the station performing a purge operation strips from the ring every received frame in its entirety, that is, the station strips the frame beginning at the starting delimiter field 41B and ending at the end of the status flag field 46B. Thus the purging station removes remnants of frames that other stations do not remove, as well as the purge marker frames from other stations.

The station should, assuming normal operation of the ring, receive first over the ring the frames it transmitted. All other frames should have been stripped by their source stations. Thus when a purging station, before receiving one of its purge marker frames and ending the purge operation, strips everything from the ring (except possibly purge marker frames belonging to another station) it rids the network of extraneous data and/or erroneous frames, such as no-owner frames. During a purge operation, a purging station may also receive frames destined for it. Thus it strips these frames and forwards them to attached devices for further processing.

As discussed above, the purging station ends the purging operation when it receives any of the following: (i) one of its own purge marker frames which an included error detection sequence indicates is error-free, (ii) the token, or (iii) a frame indicating a ring initialization (such as, in the ANSI FDDI protocol, a claim token frame or a beacon frame) (steps 56-62). When the purging station ends a purge operation, it begins operating as a normal, non-purging station. Thus it forwards, or repeats, received frames to its downstream station. As part of its normal operation, the station does not forward, but instead, strips from the ring the frames it originally transmitted, that is, frames containing its address in the source address field 43B (FIG. 2). Accordingly, when a purging station ends its purge operation after receiving a first purge marker frame, it continues to strip from the ring any redundant purge marker frames.

As explained earlier, at the beginning of the purge operation the purging station transmits a number (possibly zero) of data frames, followed by one or more purge marker frames, followed by a token. Other stations on the ring which have data to transmit thereafter capture the token, transmit their data, and finally release (i.e., transmit) the token. These data frames from other stations are received by the purging station following the last of its purge marker frames. Thus the station, which is operating as a normal station after receipt of its purge marker frames, forwards these data frames so that they can propagate completely around the ring. These data frames thus pass all stations on the ring, including the destination station, and then return to the source station. Proper forwarding of such data frames by the purging station is ensured because the purging station terminates its purging operation as soon as it receives a purge marker frame. When the purging station next receives a token, which indicates the end of a previous transmission, it begins a new purge operation (Steps 50–52).

Under error free operation, the purging station should receive its purge marker frames before it receives a token simply because it transmitted its purge marker frames before it transmitted the token. If the station receives a token before it receives one of its purge marker frames, it indicates that this token precedes the purge marker frames. Thus the station detects a multiple token error condition. Multiple token detection activities are discussed in more detail in Section 4 below. If the purging station receives a second token while it is still holding a token, the station strips the second token from the ring and continues its purge operation. By stripping this second token, the purging station may correct an existing multiple token condition, and thus, the purging station does not count this situation as a detected multiple token error condition. The receipt of a second token ends a purge operation and counts as a multiple token error condition only if the token is received after the release of the first token and before the receipt of a purge marker frame.

Similarly, if the purging station receives one of its purge marker frames before it transmits any purge marker frames in the current purge operation, it strips the received purge marker frames and continues its purge operation. However, if the purging station has already transmitted at least one of its purge marker frames during the current purge operation and it is still holding the token when it receives one of its purge marker frames, it ends its current purge operation. It does not count this as a multiple token error condition.

3. Purging Using Purge Marker Frames with Sequence Numbers

In the preferred embodiment of the purge operation discussed below with reference to FIG. 4, the purge marker frames contain, in addition to the station address and the error detection sequence as in the first embodiment, a sequence number associated with the particular purge operation. The sequence number begins at a predetermined value and is incremented each time the purging station begins a new purge operation. All of the purge marker frames transmitted as part of a purge operation contain the same sequence number. When the sequence number reaches its maximum value it is restarted, that is, wrapped around to the beginning value. A preferred sequence number is a one-bit number, thus, it alternates between "0" and "1" to indicate the then current purge operation.

Figure 4:
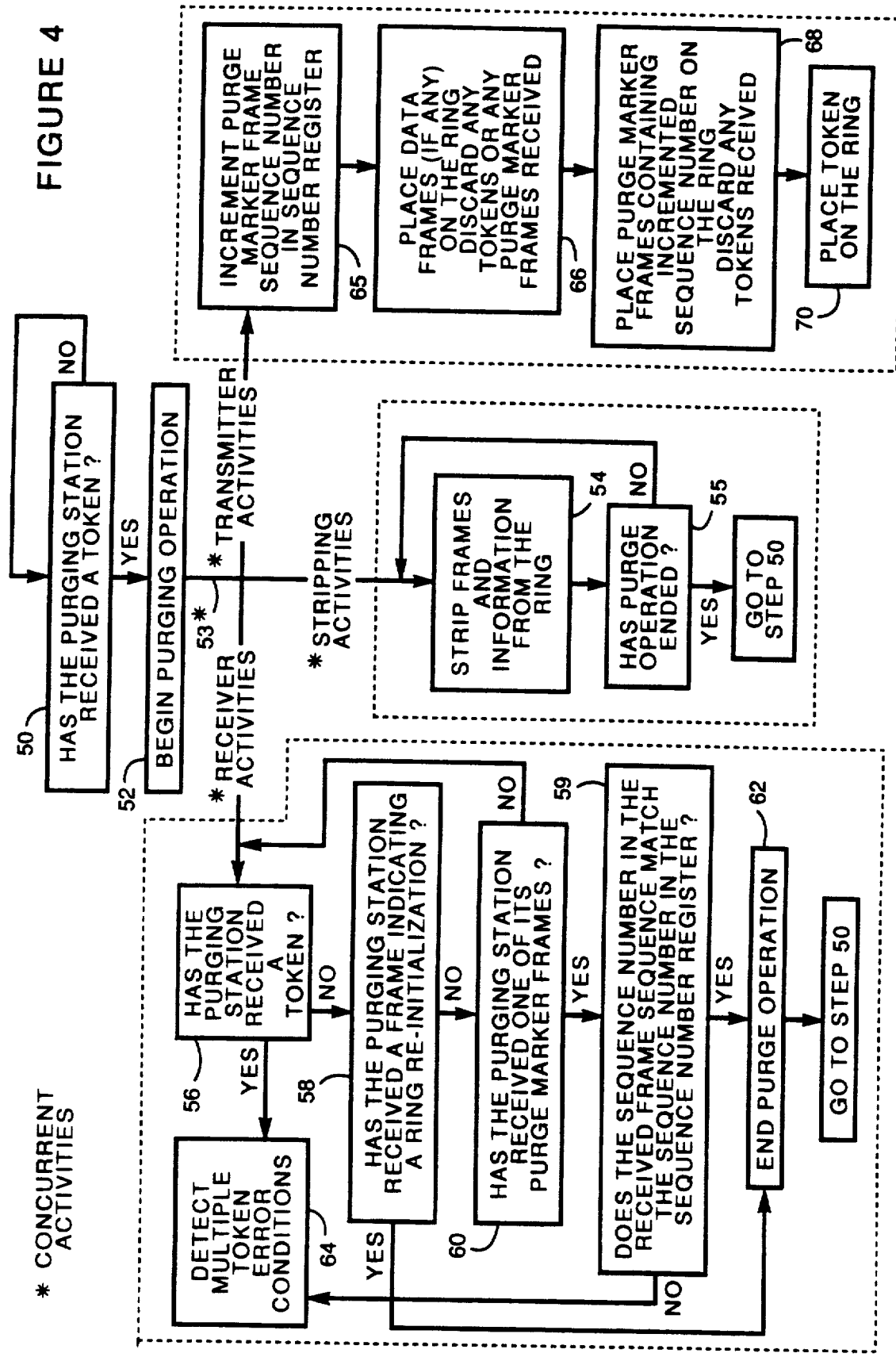
FIG. 4 is a flow chart depicting the operation of stations functioning as purging stations and multiple token detecting/correcting stations in accordance with the preferred embodiment that uses sequence numbers in the purge marker frames.

Comparing the purge operation of the first embodiment shown in FIG. 3 with the preferred embodiment of the purge operation shown in FIG. 4, it can be seen that the preferred purge operation includes all the steps of the first embodiment and adds two additional steps 59 and 65. As described above with reference to FIG. 3, the purging station concurrently performs transmitting, stripping and receiving operations as indicated by arrow 53.

Referring now to FIG. 4, when the purging station receives a token it starts a new purge operation (steps 50–52). The station first increments its sequence number, and then stores the new sequence number for future reference (step 65). Next, the station places on the ring: (i) any data frames it has ready to transmit, (ii) one or more purge marker frames containing the new sequence number, and (iii) the token (steps 66–70). Meanwhile, as the station is incrementing its sequence number and transmitting its various frames, it is also stripping from the ring everything it receives (step 54). If the station receives a second token while it is still holding the token, the station discards the second token and continues its purge operation without interruption. Thus the station does not increment its sequence number.

The station continues its purge operation until it receives (i) one of its own purge marker frames (ii) a token, or (iii) a frame indicating a ring re-initialization (steps 56–62). If a purging station receives a token before it receives one of its purge marker frames, or if it receives one or more purge marker frames which contain the wrong sequence number, the station detects a multiple token error condition. Multiple token error condition detection activities are discussed in more detail in Section 4 below.

When the purging station receives one of its purge marker frames, it stops its purging operation and compares the frame sequence number with the stored sequence number (step 59). If the sequence numbers match, it indicates that the ring is operating properly and the station simply ends its purge operation. If the sequence numbers do not match it indicates that multiple tokens may be on the ring, and the station detects a multiple token error condition (steps 59, 64).

4. Multiple Token Error Condition Detection Activities

As set forth above, a purging station detects a multiple token condition if it receives a token before a purge marker frame. Also, if the station includes a sequence number in the purge marker frame, it detects a multiple token error condition if it receives one or more purge marker frames which contain the wrong sequence number. Once the station detects a multiple token error condition it does one of three things, depending on the protocol implementation of this invention. It either (1) continues its purging operation until it receives its own purge marker frame, (2) immediately re-initializes the ring, or, preferably, (3) ends its current purge operation and increment a multiple token error condition count. If the ring protocol follows option (3), the purging station causes a ring initialization to correct the multiple token error condition only after it detects the condition a pre-determined number of times. The protocol implementation of this invention may require that the error condition be detected the pre-determined number of times within a given period of time, or it may require consecutive detection of the condition a predetermined number of times before a ring initialization is performed.

Using the preferred option (3), the ring is allowed to correct the multiple token error condition through normal operations before the activities on the ring are disrupted by a ring initialization. Also, requiring that the condition be detected a number of times ensures that the station does not start multiple token correction procedures when another error condition is causing the sporadic altering or removing of the purge marker frames.

On a ring which does not use sequence numbers in the purge marker frames, i.e., a ring following the purge operation of the first embodiment, the only way in which a purging station can detect a multiple token error condition is by receiving a token before receiving a purge marker frame. If the station follows option (3), it increments its error condition count on receipt of the token.

If the count is below the number required for a ring initialization, the station then refrains from starting another purge operation for a period of time which is long enough to ensure that a token has traversed the ring at least twice, or until it twice receives the token. The station refrains from purging to allow any purge marker frames on the ring to traverse the ring and return to their source station. The purging station operating as a normal station recognizes its source address in the frames and removes them. After two token rotations the purging station should have stripped the ring of all purge marker frames. If the station did not refrain from starting a new purge operation, it would place purge marker frames before each token it received. Eventually, all the tokens would become associated with purge marker frames and the error condition would become undetectable.

If the ring uses sequence numbers, the station need not refrain from starting a purge operation when its error count is below the number required for a ring initialization. Each time the station begins a purge operation it increments the sequence number. If multiple tokens are on the ring the station transmits purge marker frames with a first sequence number upon receipt of a first token and later transmits purge marker frames with a second number upon receipt of a second token. When the first purge marker frames return to the station, the station detects an error because the frame sequence numbers do not match the number associated with the current (second) purge operation. Upon receipt of the token, the station again increments the sequence number and begins a new purge operation. The station next receives the purge marker frames associated with the second token. Again, the frame sequence numbers do not match the number of the then current operation, and thus, the station detects another error condition. If multiple tokens remain on the ring, the sequence numbers in the received purge marker frames will not match the numbers of the current purge operations and the station will detect the error condition a sufficient number of times to cause a ring initialization.

For sections 5 and 6, ring initialization overrides any intermediate state that the station is in, that is, after a ring initialization a station re-starts the mechanism for selection of a purging station.

Placing sequence numbers in the purge marker frames allows a station to detect reliably a multiple token error condition. Further, it allows a station to determine whether or not the ring, through normal operations, has corrected the condition. The inclusion of a sequence number in the purge marker frame does not require complicated circuitry; it requires only that the station maintain, in storage, a number associated with the then-current purge operation.

If the ring uses the first mechanism, that is the mechanism without sequence numbers in the marker frames, the station must have a timer to time the periods during which the station refrains from starting a purge operation after the detection of a multiple token error condition (if the station is operating under the preferred option 3 discussed above). A station operating under current network protocol, for example, ANSI FDDI or IEEE 802.5 standard protocols, monitors the time it takes a token to traverse the ring. The stations set timers which last for the standard maximum token rotation time. Thus the station could easily maintain a timer which lasts twice the maximum rotation time to accommodate the purge operation. The ease with which the purge mechanism is implemented must be balanced against the possibility of no-owner frames circulating around the ring during the period in which the station refrains from performing a purge operation. Thus, the ring implementor must weigh the consequences of using the more complex purge operation including sequence numbers against the consequence of having no-owner frames circulating around the ring for a limited period of time in choosing the purge method for the ring.

5. Selection of a Purging Station Using Purger Hello Frames

Figure 5:
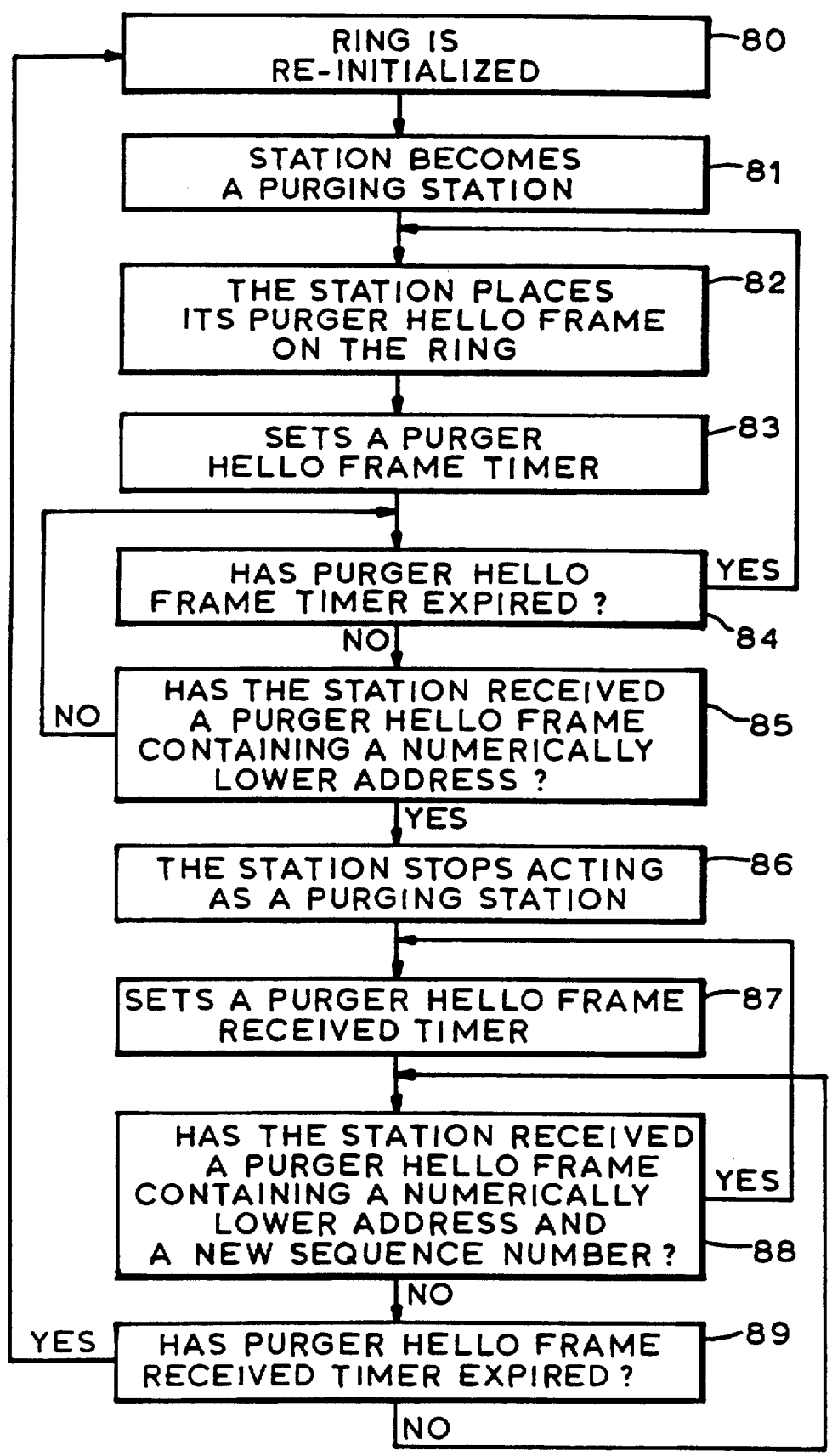
FIG. 5 is a flow chart illustrating a first method of selecting a purging station.

A purging station must be selected after each ring initialization. With reference to FIG. 5, using a first method of selecting a purging station, each properly functioning station on the ring operates initially as a purging station and places on the ring a "purger hello" frame, that is, a frame containing the station address as the source address and a code identifying it as a purger hello frame, (steps 81-82). Each of these stations above then acts as a purging station in accordance with Section 2 or 3 above, until it receives a purger hello frame containing an address which is numerically smaller than its own address (steps 81-86). When a station transmits a purger hello frame, it sets a purger hello frame timer (steps 82-83). When the timer expires, the station transmits another purger hello frame (step 84). If the station at any time receives a purger hello frame containing an address which is smaller than its own, it stops operating as a purging station and disables its purger hello frame timer (steps 85-86). Eventually, there is only one station operating as a purging station, which is the station with the lowest address.

The preferred length of a purger hello frame timer for a 100 megabit FDDI ring is ten seconds, plus or minus two seconds. Thus the maximum length of this purger hello frame timer is twelve seconds.

When a station becomes a non-purging station, it sets a purger hello frame received timer to time the receipt of the next purger hello frame containing a numerically smaller address (steps 87-89). Each time a non-purging station receives such a frame it resets the timer (steps 88-89). If the purger hello frame received timer expires before such a purger hello frame is received, the non-purging station again becomes a purging station (step 89). The station thereafter periodically transmits its purger hello frames and performs purging operations until it receives a purger hello frame containing a numerically smaller address. Thus even if the selected purging station becomes inoperative the maximum time a ring is without a purging station is less than two cycles of the purger hello frame received timer.

The preferred length of time for the purger hello frame received timer on a 100 megabit FDDI ring is three times the maximum length of the purger hello frame timer. Thus, the purger hello frame received timer has a cycle of 36 seconds and the two cycle maximum timer that the ring is without a purging station is 72 seconds. The exact length of the purger hello frame and the purger hello frame received timers is not critical. However, the ratio of the two timers is important. A non-purging station waits three times the maximum time allowed for a purging station to transmit a purger hello frame. This prevents a non-purging station from unnecessarily becoming a purging station. Thus, it promotes the operation of the ring with a single purger station.

The purger hello frames preferably contain sequence numbers. Thus before a purging station transmits a purger hello frame it first increments its purger hello frame sequence number and then incorporates the new number in the purger hello frame. When a non-purging station receives the purger hello frame it compares the sequence number with the number that was in the previous purger hello frame. If the numbers differ, the station re-sets its purger hello frame received timer. Otherwise, the station does not re-set its timer. Accordingly, if the ring purging station becomes inoperative and therefore becomes unable to strip its previously transmitted purger hello frame, for example, if it is removed from the ring, the non-purging stations will not continue to re-set their timers based on the receipt of the old purger hello frame, that is, the frame which contains the same sequence number.

When a non-purging station becomes a purging station due to the expiration of its purger hello frame received timer, it must strip from the ring any remaining purger hello frames transmitted by the previous purging station. These frames are no-owner frames because the previous purging station is inoperative. The purging station may accomplish this either by causing a ring initialization as indicated in FIG. 5, or by ensuring that it performs at least one purge operation before it becomes a non-purging station due to the receipt of a purger hello frame containing a smaller station address.

Instead of selecting the station with the numerically lowest address as the purging station, the ring protocol may select as the purging station the station with the highest station address. The selection method is essentially the same, except that timers are re-set only for purger hello frames which contain larger addresses. Each station on a ring must follow the same method of selecting a purging station.

6. Purger Station Selection Using Candidate Hello Frames

Figure 6:
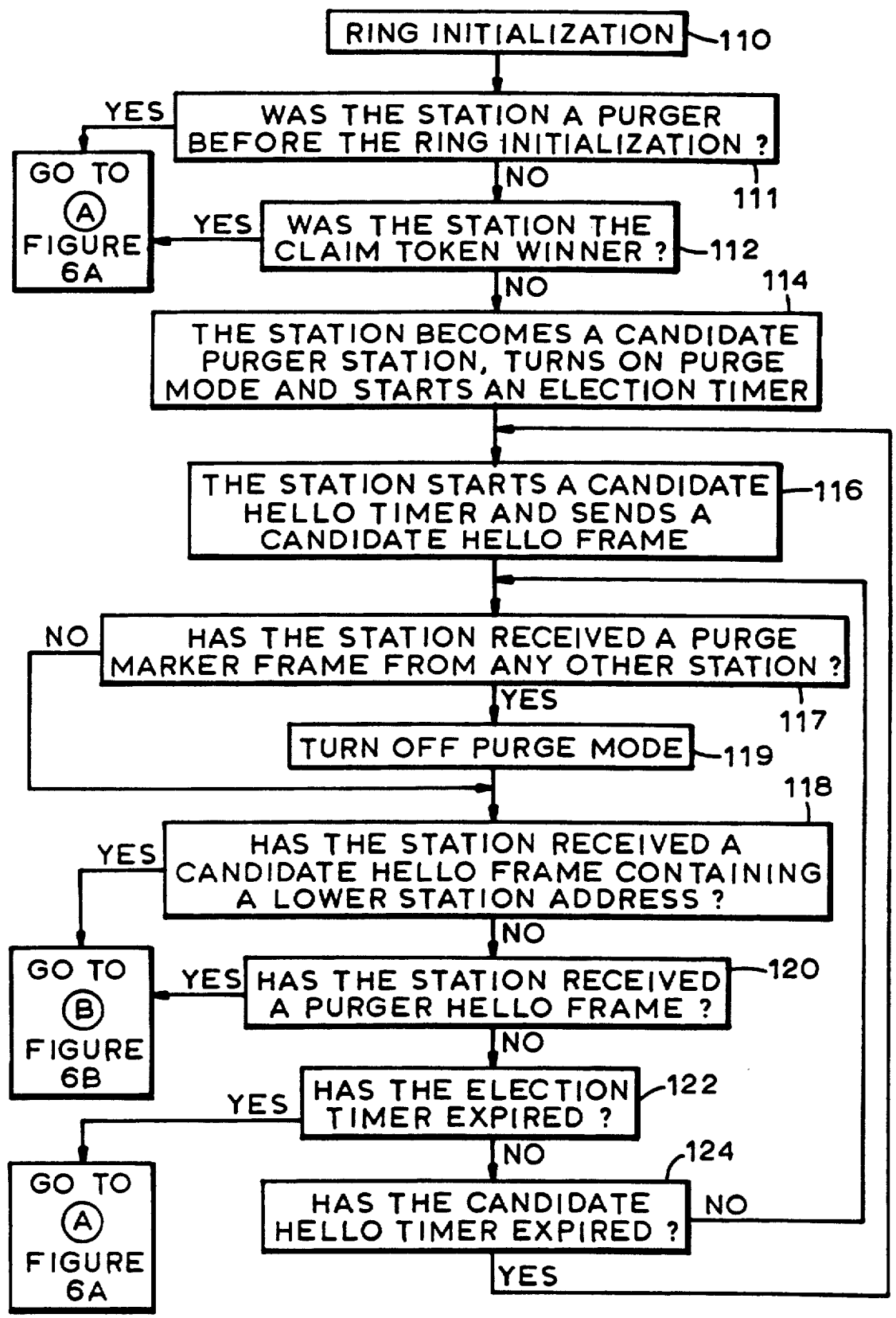
FIGS. 6, 6A and 6B together constitute a flow chart illustrating a second, preferred method of selecting a purging station that uses candidate hello frames.

A purging station may be selected using a second, preferred purger station election procedure. With reference to FIGS. 6-6B, if the station operating as the ring purger before the initialization is still operative, it continues to act as the ring purging station during the election (steps 110-111). If the previous ring purger is no longer operative, the station which wins the right to issue the token, that is, the station that wins the claim token operation in accordance with the ring protocol, acts as the ring purger during the election (step 112).

Figure 6A:
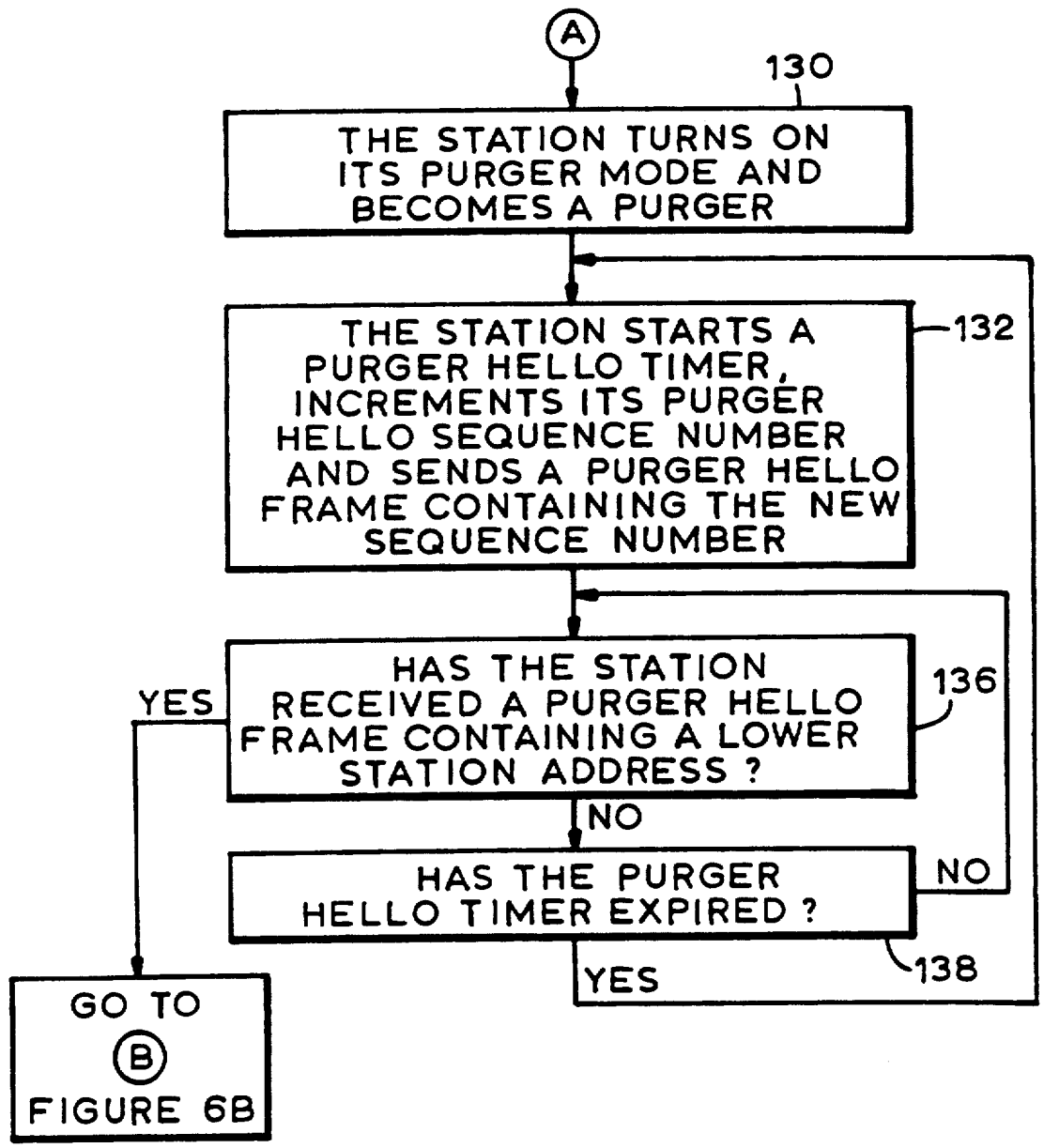
Figure 6B:
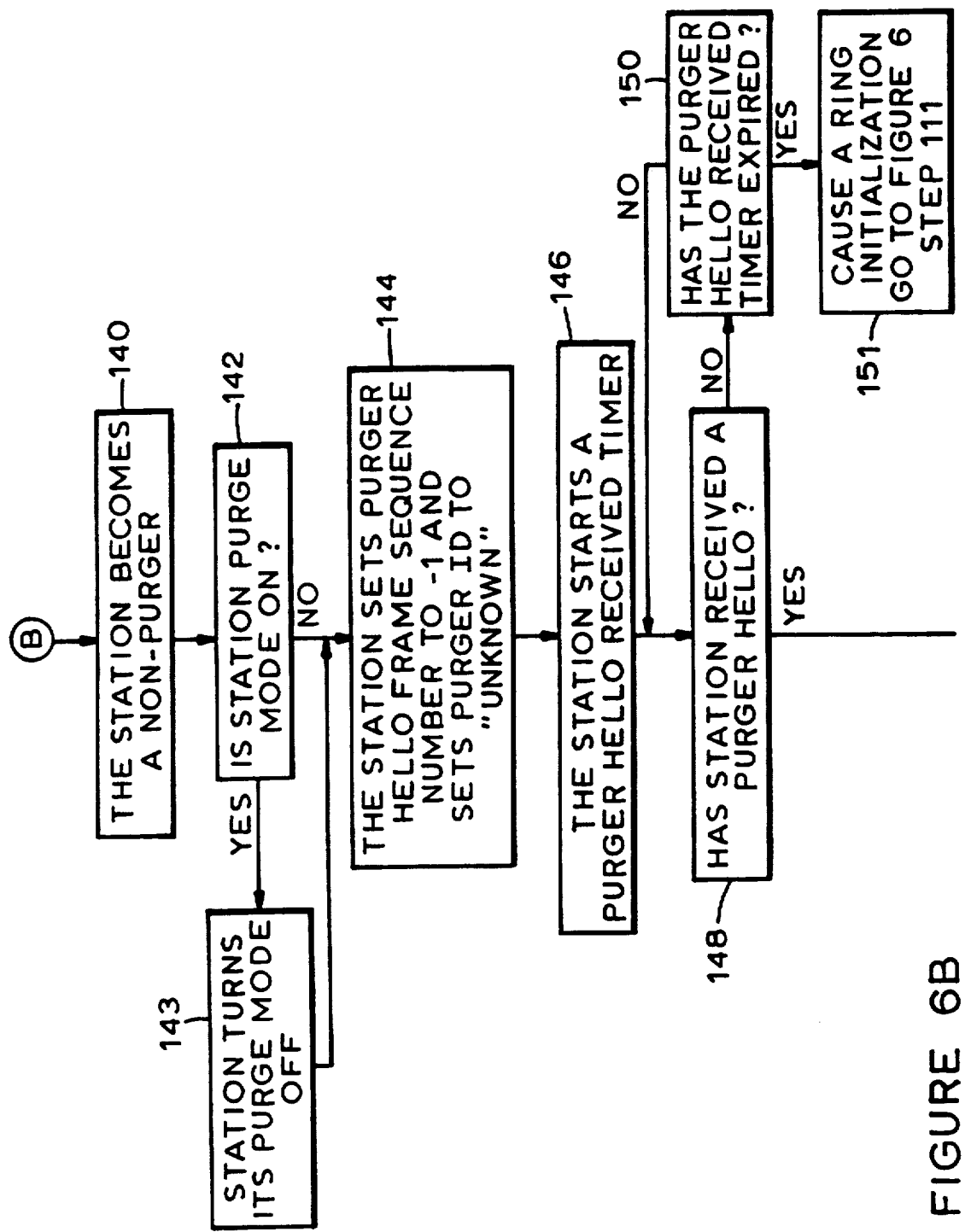
Figure 6B:
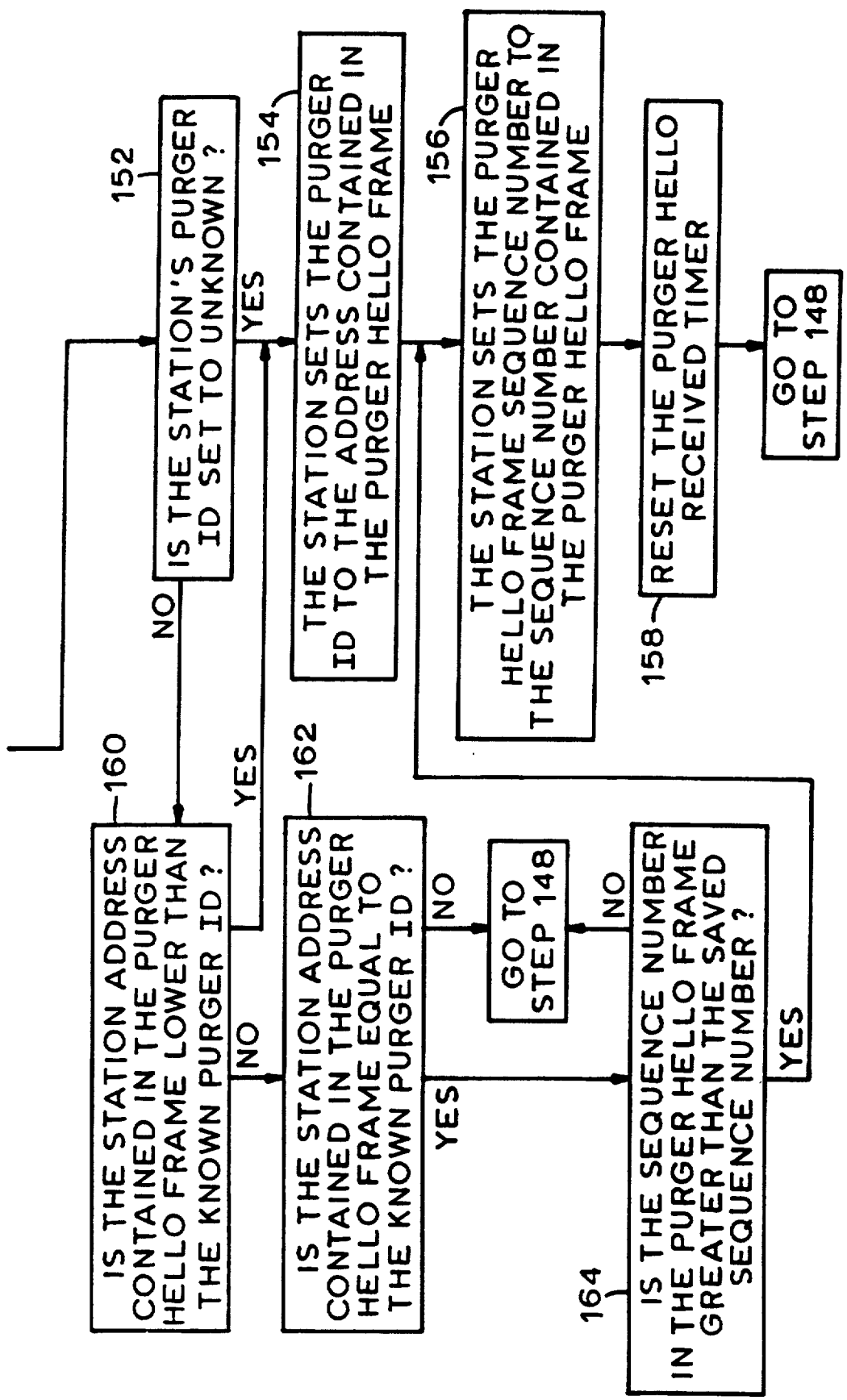

Referring now to FIG. 6A, the station acting as the ring purger at the start of the selection procedure increments its purger hello frame sequence number and issues a purger hello frame containing the new sequence number. It also starts a purger hello frame timer to time the release of a next purger hello frame (steps 130-132). The station continues to operate as the ring purger until it receives a purger hello frame containing a numerically smaller station address (steps 134-136).

The other stations on the ring act initially as candidate purging stations. Referring again to FIG. 6, each candidate station turns on its purge mode and sets an election timer which establishes the maximum time that the station will remain a candidate (step 114). Each candidate station next issues a "candidate hello" frame which contains the station address and a frame-type code indicating that it is a candidate hello frame. Finally, each station sets a candidate hello frame timer to determine when to issue a next candidate hello frame. If the station, at any time, receives a candidate hello frame which contains a smaller address (step 118), it becomes a non-candidate station as discussed in more detail below with reference to FIG. 6B. If the station is still a candidate when the candidate hello timer expires, and the election is still underway, the station issues another candidate hello frame and re-sets the hello timer (step 124). If a station is still a candidate when its election timer expires it essentially declares itself the ring purging station (step 122). The station will then issue purger hello frames.

The preferred length of time for the purger hello frame timer, as well as the candidate hello frame timer, on a 100 megabit FDDI ring is ten seconds plus or minus two seconds. Thus the maximum time for the purger hello frame timer and the candidate hello frame timer is twelve seconds.

While the station is a candidate purging station, it performs purging operations but it does not issue purger hello frames. When a candidate purging station receives a purge marker frame from another station, it stops its purging operations (step 117, 119) and becomes a candidate non-purging station. Thus it turns its purge mode off (steps 117, 119). Thereafter the station participates in the election by issuing candidate hello frames (steps 118-124). The candidate purging station does not, however, issue purger hello frames.

Referring now to FIG. 6B, when a candidate purging station receives a purger hello frame it becomes a non-candidate non-purging station (step 140). The station thus turns off its purge mode (if it is still on), and sets a purger hello frame sequence number register to negative 1 and a purger id register to a condition representing "unknown" (steps 142-144). The station then starts a purger hello frame received timer and waits for the receipt of another purger hello frame (step 146). If the station does not receive another purger hello frame before the purger hello frame received timer expires, the station begins a new purger station selection operation and becomes a purging candidate-station (steps 148-151). The new purging candidate-station must remove from the ring purger hello frames belonging to the previous purging stations. It may accomplish this by causing a ring initialization as indicated in FIG. 6B.

When a non-purging station which has its purger hello frame sequence number register set to negative one and its purger id register set to unknown receives a purger hello frame it sets its purger sequence number register and its purger id register, respectively, to the sequence number and the address contained in the frame (steps 152-154). It then re-sets its purger hello frame receive timer (step 158). When the station next receives a purger hello frame it compares the address in the received frame with the stored purger address. If the address in the received frame is numerically smaller than the stored address the station re-sets the purger id register to the address contained in the frame (steps 152, 160). The station then re-sets its purger sequence number register to the frame sequence number and re-starts the purger hello frame received timer (steps 156-158).

If the non-purging station receives a purger hello frame containing the same source address as the purger id, it resets its purger hello frame received timer only if it receives a new purger hello frame, that is, a purger hello frame with a new sequence number (steps 160-164). If the address in the received purger hello frame is equal to the address in the purger id register, the station compares the sequence number of the frame with the sequence number stored in the purger hello frame sequence number register (steps 162-164). If the frame sequence number is larger than the stored sequence number, indicating that the received purger hello frame is a "new" one, the station re-sets its sequence number register to the frame sequence number. The station then re-sets its purger hello frame received timer (steps 156-158).

If the sequence number in the received frame is equal to or smaller than the stored sequence number, indicating that the purger hello frame is not a new one, the station ignores it and does not re-set its purger hello received timer (steps 162-164). Similarly, the station ignores purger hello frames containing addresses which are larger than the stored purger address (step 162). Accordingly, if a station operating as the ring purging station becomes inoperative and it therefore does not remove its purger hello frames from the ring, the non-purging stations will not continue to re-set their timers based on the receipt of the old purger hello frame, that is, a frame with the same sequence number. If the purger hello received timer expires, the station starts a new election process by initializing the ring (step 151).

During this preferred purging station selection procedure the candidate stations perform purging operations until they receive a purge marker frame from other stations. The candidate stations, whether or not they are performing purging operations, continue to participate in the purging station election procedure as set forth above. Thus they continue to monitor the receipt of candidate and purger hello frames to determine when to become candidate non-purging or non-candidate non-purging stations, respectively. Thus, at any given time during the election, except initially, there is at most one station acting as a purging station.

The length of an election, that is, the length of the election timer, is three times the maximum length of the candidate hello frame timer. Thus the election may last for as long as 36 seconds.

In an alternative embodiment of this second selection procedure, the candidate stations do not perform purge operations. The election proceeds as set forth above, except that the ring may be operating for a time without a purging station. For example, if the station previously operating as the ring purger is inoperative and/or the station winning the claim token operation is incapable of operating as a purging station, all the stations are operating as candidates, and therefore, none of them is purging. The selection procedure is relatively short, however, and thus, the operations of the ring will not be significantly affected during the short time without an active purger.

The time during which the station may be operating without an active purger is the maximum timer period, for an election, i.e., 36 seconds.

The current purging selection procedure ensures that a purging station is operational within a relatively short time after a ring initialization or a purging station failure. It further ensures that only one station operates as a purging station.

The purging mechanism which has stations operating as candidates is the preferred method because there is typically just on station operating as a ring purger station at any given time. However, in order for a station to operate as a candidate, it must maintain a candidate hello frame timer. This timer is the same as the purger hello frame timer, that is, it lasts for ten seconds plus or minus two seconds. A single timer can monitor the receipt of both the candidate hello and purger hello frames. However, an additional election timer is required. The election mechanism which uses only purger hello frames is simple; however, it degrades performance due to having more than one station operating as a purging station at a given time. The ring implementor must weigh the advantages and disadvantages of each method for the particular ring and must choose between them when selecting a purger selection mechanism.

The purging station selection operation, using either of the procedures described above, ensures that at least one purging station is operating on the ring. There may be a short interval during which no purger is operational, either due to a purger failure or a ring re-initialization. This is acceptable because the existence of a purger is not necessary for correct operation of the ring, it is only essential for providing good performance on the ring in the presence of no-owner frames. For example, during this short interval no-owner frames may result in duplicate processing at destination stations. The invention attempts to minimize the interval during which there is no purger on the ring.

Each of the inventive mechanisms for selecting a purger may result in multiple purgers operating on the ring simultaneously for a short period of time. This results in some performance degradation because the multiple purgers use bandwidth on the ring to transmit their purge marker frames. It is preferable to have only a single purger operational at all times. Thus the inventive mechanisms operate quickly to ensure that only one of the multiple purging stations remains operational.

The purging stations transparently strip no-owner frames from the ring, and thus normal ring operations are not interrupted. The no-owner frames are stripped before they can completely traverse the ring a second time, that is, after they have traveled from source station to destination station and passed the source station without being stripped. Accordingly, the frames are received by the destination stations at most twice.

Using the current invention, the purging stations also detect multiple tokens on the ring. The stations allow normal ring operations to correct the condition, and affirmatively correct it with a ring initialization only if it persists. The purging stations thus perform purging operations and multiple token detection operations without unnecessarily interrupting normal ring operations. Earlier purging methods do not perform multiple token detection. Accordingly, the multiple token error condition may continue unchecked for a significant period of time, resulting in lost data.

Figure 7:
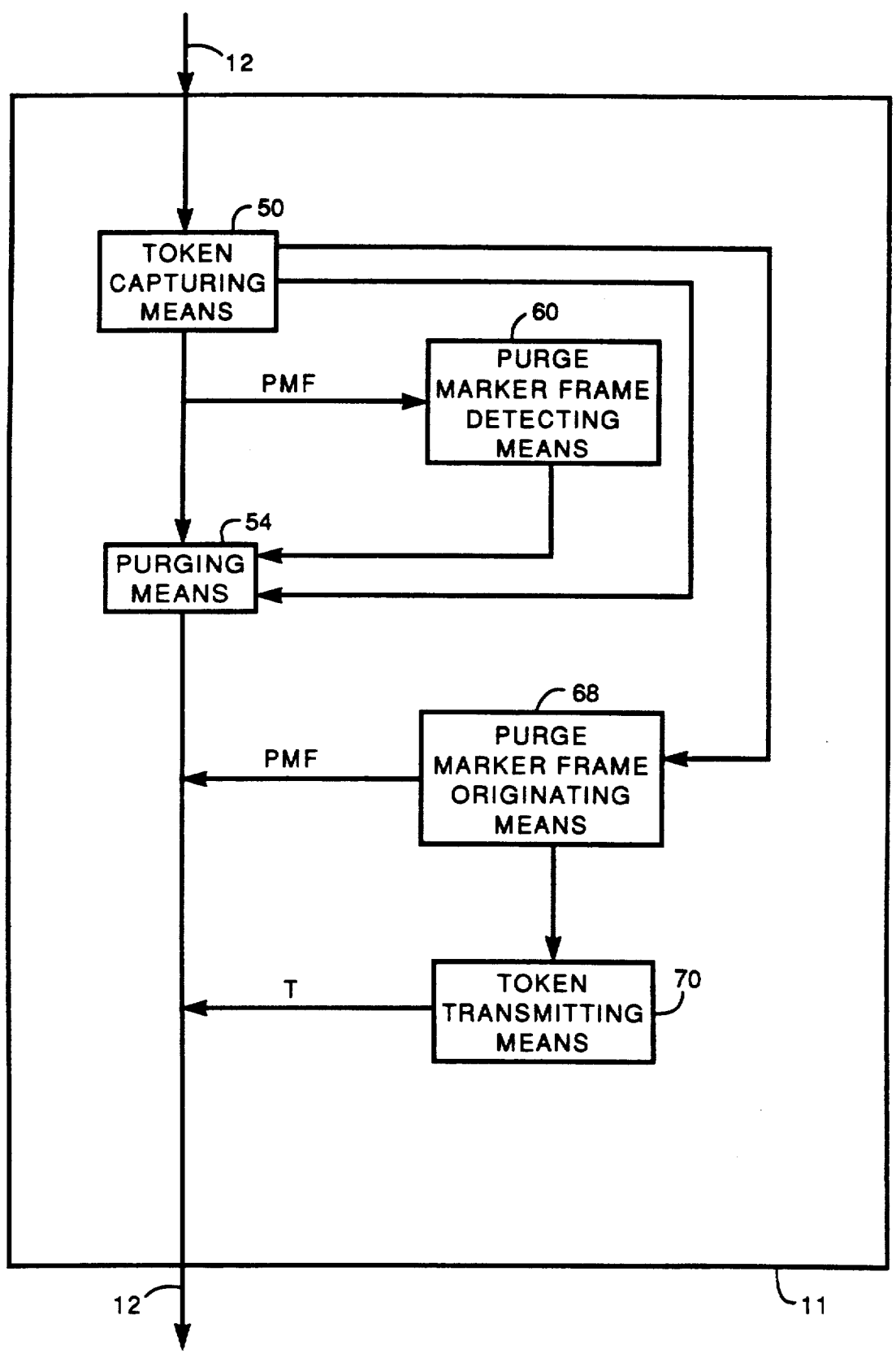
FIG. 7 is a diagram of the logical elements of a purging station.

FIG. 7 shows a station 11 for a token-ring network 12, said station 11 comprising: a token capturing means 50 for detecting a token on the network 12 and removing it; an originating means 68 responsive to said token capturing means 50, for originating a set of one or more purge marker frames and transmitting said purge marker frames onto the network 12 after said token capturing means 50 removes the token; a token transmitting means 70 for transmitting the token after said purge marker frames are transmitted; a purge marker frame detecting means 60 for detecting said purge marker frames on the network 12; and a purging means 54 for performing purging operations.

During operation, the purging means 54 strips from the network 12 all frames and remnants of frames received by the station 11 between the beginning of each purging operation and the end of said purging operation. The purging means 54 begins the purging operation when a token is captured by the token capturing means 50, and the purging means 54 ends the purging operation when a purge marker frame is detected by the purge marker frame detecting means 60.

Figure 8:
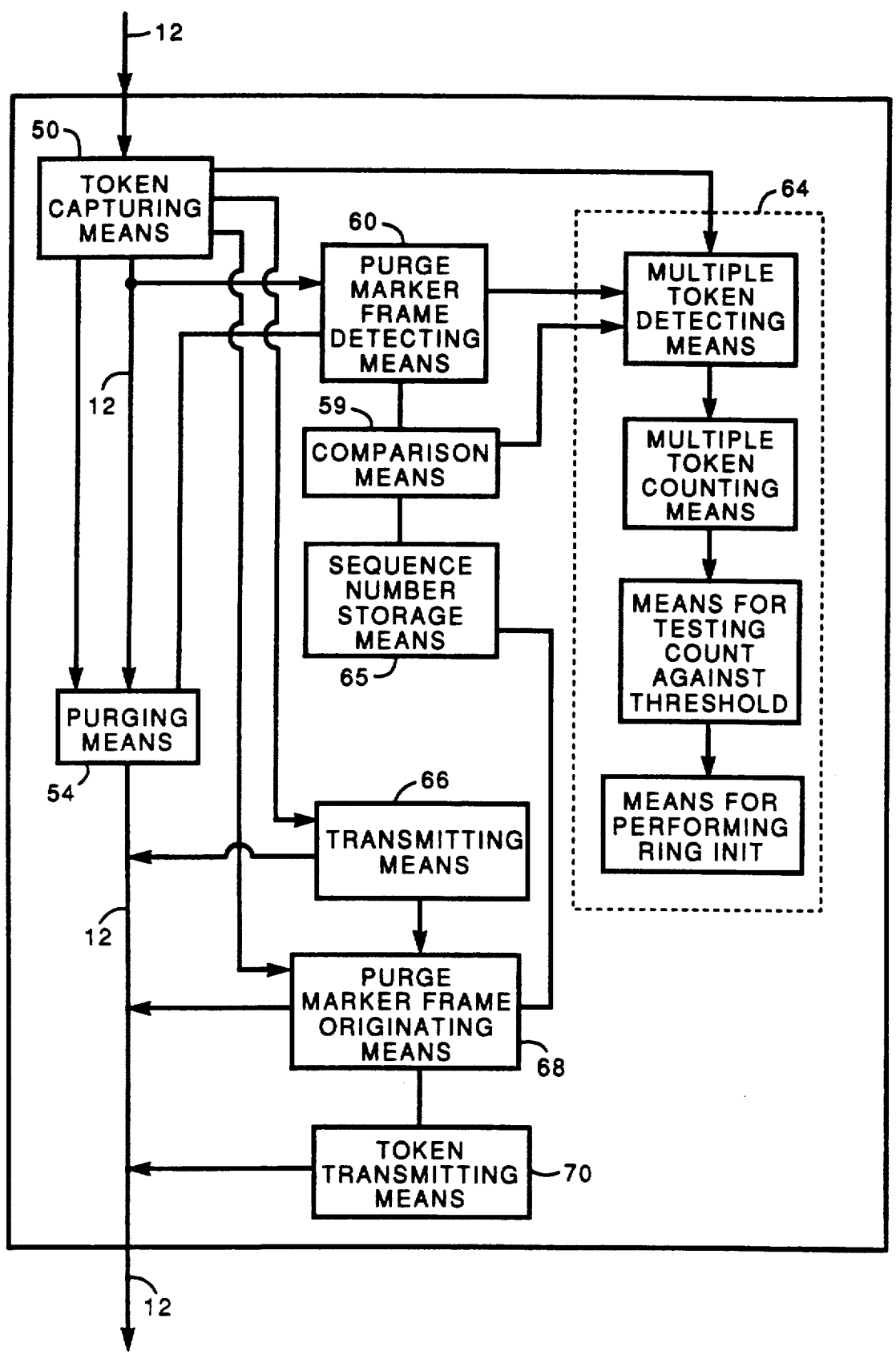
FIG. 8 is a detailed diagram of the logical elements of a purging station.

FIG. 8 shows a station 11 for a computer network 12, said station comprising: a token capturing means 50 for detecting a token on the network 12 and removing it; a transmitting means 66 for transmitting one or more data frames, if said data frames are then ready to be transmitted, onto the network 12 in response to said token capturing means 50 removing a token; an originating means 68 responsive to said transmitting means 66 and said token capturing means 50, said token capturing means 50 having removed a token, for originating a set of one or more purge marker frames containing the station address of said station in the source address field, and a sequence number corresponding to the number of times said sets of purge marker frames have been originated, said originating means 68 transmitting a set of purge marker frames onto the network 12 either after said token capturing means 50 removes the token or at the end of the transmission of data frames; a token transmitting means 70 for transmitting the token after said set of purge marker frames is transmitted; a sequence number storage means 65 for storing the sequence number includes in the last released set of purge marker frames; a purge marker frame detecting means 60 for detecting a purge marker frame on the network 12; a comparison means 59 for comparing the sequence number in a detected purge marker frame containing the station address of the station with the stored sequence number; a purging means 54, responsive to said token capturing means 50 and said purge marker frame detecting means 60, for stripping from the network 12 all frames and remnants of frames received, except a token or a purge marker frame containing the station address of another station in the source address field of said purge marker frame, after the token is captured and before either an error-free purge marker frame or a token is detected; a multiple token detecting means 64 for detecting a multiple token condition in response to either said comparison means 59 indicating that said sequence number in said detected purge marker frame and said stored sequence number do not match, or said token capturing means 50 detects a token before a purge marker frame containing the station address of said station 11 in the source address field of said purge marker frame is detected, said multiple token detecting means 64 further including a counting means for counting the number of times a multiple token condition is detected, and a means for performing a ring correction operation if the number of times the multiple token condition is detected exceeds a predetermined value.

The foregoing description has been limited to a number of specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A station (11A . . . 11F) for a token-ring network (10, 12A . . . 12F), said station comprising:

A. token capturing means (11A . . . 11F, 50, 52, 56) for detecting (50) a token on the network (10, 12A . . . 12F) and removing it;
B. originating means (11A . . . 11F, 66, 68, 70) responsive to said token capturing means (11A . . . 11F, 50, 52, 56) for originating (68) a set of one or more purge marker frames and transmitting (68) said purge marker frames onto the network (10, 12A . . . 12F) after said token capturing means (11A . . . 11F, 50, 52, 56) removes (50) the token;
C. token transmitting means (11A . . . 11F, 70) for transmitting (70) the token after said purge marker frames are transmitted (68);
D. purge marker frame detecting means (11A . . . 11F, 60) for detecting (60) said purge marker frames on the network (10, 12A . . . 12F); and
E. purging means (54) for performing purging operations wherein the purging means (54) strips (54) from the network all frames and remnants of frames received by the station (11A . . . 11F) between the beginning of each purging operation and the end of said purging operation, and the purging means (54) begins the purging operation when a token is captured (50) by the token capturing means (11A . . . 11F, 50, 52, 56), and the purging means (54) ends (62) the purging operation when a purge marker frame is detected (60) by the purge marker frame detecting means (11A . . . 11F, 60).

2. A station for a token-ring network, said station comprising:

A. token capturing means for capturing a token from the network;
B. purge marker frame transmitting means, responsive to said token capturing means, for transmitting at least one purge marker frame onto the network after said token capturing means captures said token;
C. purge marker frame receiving means for receiving a received purge marker frame from the network; and
D. purging means for performing a purging operation, said purging means stripping from the network all frames and remnants of frames received by the station, and said purging operation beginning upon capture of said token by said token capturing means, and said purging operation ending upon receipt of at least one of said at least one purge marker frame by said purge marker frame receiving means.

3. The station of claim 2 further comprising:

data transmitting means for transmitting one or more data frames onto the network in response to said token capturing means capturing said token, said data frames being transmitted before said at least one purge marker frame.

4. The station of claim 2 further comprising:

A. incrementing means for incrementing a sequence number in response to said token capturing means capturing said token, to obtain a current sequence number;
B. said purge marker frame transmitting means, having means for including said current sequence number in said at least one purge marker frame;
C. means, responsive to said purge marker frame receiving means, for reading a received sequence number from said received purge marker frame;
D. comparison means for comparing said current sequence number with said received sequence number, and in the event they are not equal, indicating a multiple token condition.

5. The station of claim 4, further comprising:
A. counting means for counting the number of times a multiple token condition is indicated by said comparison means; and
B. means for starting a ring initialization if the number of times the multiple token condition is indicated exceeds a predetermined number.

6. The station of claim 4, further comprising:
means for starting a ring initialization in response to the indication of a multiple token condition.

7. The station of claim 2, said purge marker frame transmitting means further comprising:
a station address of said station;
means for including said station address in a source address field in said at least one purge marker frame.

8. The station of claim 7, further comprising:
said purging means not stripping from the network a second purge marker frame containing a station address of another station in a source address field of said second purge marker frame.

9. The station of claim 2, said station further comprising:
A. incrementing means for incrementing a sequence number in response to said token capturing means capturing said token, to obtain a current sequence number;
B. said purge marker frame transmitting means having means for including said current sequence number in said at least one purge marker frame;
C. a station address of said station;
D. said purge marker frame transmitting means having means for including said station address in a source address field in said at least one purge marker frame;
E. said purge marker frame receiving means having means for reading a received sequence number from said received purge marker frame;
F. said purge marker frame receiving means having means for reading a received source address from said received purge marker frame;
G. a first comparison means for determining whether said received source address is equal to said station address;
H. a second comparison means, for determining whether said received sequence number is equal to said current sequence number; and
I. multiple token detecting means, for detecting a multiple token condition when
 1. said received source address is equal to said station address, and
 2. said current sequence number is not equal to said received sequence number.

10. A station (11A ... 11F) for a computer network (10, 12A ... 12F), said station comprising:
A. token capturing means (50) for capturing (50) a token from the network (10, 12A ... 12F);
B. data transmitting means (66) for transmitting one or more data frames onto the network (12A ... 12F) in response to said token capturing means (50) capturing (50) said token;
C. incrementing means (65) for incrementing (65) a sequence number in response to said token capturing means (50) capturing said token, to obtain a current sequence number;
D. purge marker frame transmitting means (68) responsive to said data transmitting means (66) and said token capturing means (50), said token capturing means (50) having captured a token, for transmitting at least one purge marker frame containing the station address of said station in the source address field (43B), and said current sequence number, onto the network (10, 12A ... 12F) either after said token capturing means (50) captures (50) said token or at the end of the transmission of said one or more data frames;
E. purge marker frame receiving means (60) for receiving (60) a received purge marker frame from the network (10, 12A ... 12F);
F. means (60), responsive to said purge marker receiving means (60), for reading a received source address from a source address field (43B) of said received purge marker frame;
G. means (59), responsive to said purge marker receiving means (60), for reading a received sequence number from said received purge marker frame;
H. a first comparison means (60) for determining whether said received source address is equal to the station address of said station;
I. a second comparison means (59), responsive to said first comparison means (60), for determining whether said received sequence number is equal to said current sequence number only if said received source address is equal to the station address of said station;
J. purging means (54), responsive to said token capturing means (50) and said purge marker frame receiving means (60), for stripping from the network all frames and remnants of frames received, except a token or a purge marker frame containing the station address of another station in the source address field of said purge marker frame, after said token is captured and before either an error-free purge marker frame or a second token is captured by said token capturing means;
K. multiple token detecting means (64) for detecting a multiple token condition in response to:
 1. said second comparison means (59) determining that said received sequence number and said current sequence number are not equal; or
 2. said token capturing means (50) capturing a second token before at least one of said at least one purge marker frame containing the station address of said station in the source address field of said purge marker frame is received;
L. counting means (64) for counting the number of times a multiple token condition is detected; and
M. means (64) for performing a ring initialization if the number of times the multiple token condition is detected exceeds a pre-determined value.

11. A method for purging a computer network, said method comprising the steps of:
A. detecting (50) a token on the network;
B. removing (50) the token;
C. originating (68) in response to the removal (50) of the token a set of one or more purge marker frames and transmitting (68) said purge marker frames onto the network (12A ... 12F);
D. releasing (70) the token to the network (12A ... 12F); and
E. stripping (54) from the network all data frames and remnants of frames received until an error-free purge marker frame or a token is detected (59, 60).

12. A station for a token-ring, said station comprising:
   A. detecting means for detecting a network initialization;
   B. hello frame originating means, responsive to said detecting means, for periodically transmitting purger hello frames containing a source address equal to the station address of said station onto the network in response to a network initialization;
   C. purger hello frame receiving means for receiving a received purger hello frame;
   D. comparison means, responsive to said purger hello frame receiving means, for comparing the source address contained in said received purger hello frame and the station address of said station;
   E. means, responsive to said comparison means, for refraining from originating purger hello frames if the address in the detected purger hello frame is numerically lower than the station address of said station; and
   F. means, responsive to said detecting means and said comparison means, for becoming a purging station in response to a ring re-initialization, and for remaining a purging station until said station receives a purger hello frame containing a source address which is numerically lower than the station address of said station.

13. The station of claim 12, wherein said station includes means for refraining from originating purger hello frames if the station receives, before the expiration of a purger hello frame received timer, a purger hello frame containing an address which is numerically lower than its own address.

14. A method for purging a computer network, comprising the steps of:
   A. detecting a network initialization by a station on said computer network;
   B. in response to an initialization, periodically originating purger hello frames containing the station address of said station in the source address field of said purger hello frames and transmitting said purger hello frames onto the network;
   C. receiving a received purger hello frame at said station;
   D. comparing the source address of said received purger hello frame with the station address of said station;
   E. if the source address of said received purger hello frame is numerically lower than the station address of said station, discontinuing originating said purger hello frames;
   F. setting a purger hello frame received timer in said station, if the source address of said received frame is numerically lower than the station address of said station;
   G. if a purger hello frame containing a source address which is numerically lower than the station address of said station is received before said purger hello frame received timer expires, repeating steps C-G; and
   H. reinitializing the ring if no purger hello frame is received containing a source address that is numerically lower than the station address of said station before said purger hello frame received timer expires.

15. A network containing a plurality of stations, said stations comprising:
   A. token capturing means for capturing a token from the network;
   B. data transmitting means for transmitting one or more data frames onto the network in response to said token capturing means capturing said token;
   C. purge marker frame transmitting means responsive to said transmitting means and said token capturing means, for transmitting at least one purge marker frame containing the station address of said station in the source address field onto the network either in response to said token capturing means capturing said token or at the end of the transmission of said one or more data frames;
   D. purge marker frame receiving means for receiving a received purge marker frame from the network; and
   E. purging means responsive to said token capturing means and said purge marker frame detecting means, for stripping from the network all frames and remnants of frames received, except a token or a purge marker frame containing the station address of another station in the source address field of said purge marker frame, after said token is captured and before at least one of said at least one purge marker frame is received, or a second token is captured by said token capturing means.

16. The network of claim 15, said station further comprising:
   A. incrementing means for incrementing a sequence number in response to said token capturing means capturing said token, to obtain a current sequence number;
   B. means for including said current sequence number in said at least one purge marker frame;
   C. a station address of said station;
   D. means, responsive to said purge marker receiving means, for reading a received sequence number from said received purge marker frame;
   E. means, responsive to said purge marker receiving means, for reading a received source address from a source address field of said received purge marker frame;
   F. a first comparison means for determining whether said received source is equal to said station address of said station;
   G. a second comparison means, responsive to said first comparison means, for determining whether said received sequence number is equal to said current sequence number, only if said received source address is equal to said station address of said station; and
   H. multiple token detecting means, responsive to said second comparison means, for detecting multiple tokens in response to said second comparison means determining that said received sequence number and said current sequence number are not equal.

17. The network of claim 16, said multiple token detecting means further comprising:
   counting means for counting the number of times multiple tokens are detected and if the number exceeds a predetermined value starting a ring initialization to eliminate the multiple tokens.

18. The network of claim 16, said multiple token detecting means further comprising:
   means for starting a ring initialization to eliminate the multiple tokens after a multiple token is detected.

19. A station on a network, said station comprising:
   A. detecting means for detecting a network initialization;

B. means, responsive to said detecting means, for setting a purger election timer;

C. candidate hello frame transmitting means, responsive to said detecting means, for periodically transmitting candidate hello frames, said candidate hello frames containing a source address equal to the station address of said station, on to the network;

D. candidate hello frame receiving means for receiving a received candidate hello frame from said network;

E. a first comparison means, responsive to said candidate hello frame receiving means, for comparing the source address contained in said received candidate hello frame and the station address of said station;

F. means, responsive to said first comparison means, for disabling said candidate hello frame transmitting means to prevent said transmitting of said candidate hello frames if the source address in said received candidate hello frame is numerically lower than the station address of said station; and G. means for declaring said station a network purging station if said purger election timer expires before a candidate hello frame with a lower source address than the station address of said station is received by said station.

20. A method for purging a token-ring network, comprising the steps of:

A. capturing a token from the network;

B. transmitting at least one purge marker frame onto the network;

C. receiving a received purge marker frame from the network; and

D. performing a purging operation, said purging operation stripping from the network all frames and remnants of frames received by the station, said purging operation beginning upon capture of said token, and said purging operation ending upon receipt of at least one of said at least one purge marker frame.

21. The method of claim 20, said purging operation also ending upon capture of a second token.

22. The method of claim 20, further comprising:
transmitting one or more data frames onto the network in response to capturing said token, said data frames being transmitted before said at least one purge marker frame.

23. The method of claim 20, further comprising:

A. incrementing a sequence number in response to capturing said token, to obtain a current sequence number;

B. including said current sequence number in said at least one purge marker frame;

C. reading a received sequence number from said received purge marker frame;

D. comparing said current sequence number with said received sequence number, and in the event they are not equal, indicating a multiple token condition.

24. The method of claim 23, further comprising:

A. counting the number of times a multiple token condition is indicated; and

B. starting a ring initialization if the number of times the multiple token condition is indicated exceeds a predetermined number.

25. The method of claim 23, further comprising:
starting a ring initialization in response to the indication of a multiple token condition.

26. The method of claim 20, further comprising:
including the station address of said station in a source address field in said at least one purge marker frame.

27. The method of claim 26, further comprising:
not stripping from the network a second purge marker frame containing a station address of another station in a source address field of said second purge marker frame.

28. The method of claim 20, further comprising:

A. incrementing a sequence number in response to capturing said token, to obtain a current sequence number;

B. including said current sequence number in said at least one purge marker frame;

C. including the station address of the transmitting station in a source address field in said at least one purge marker frame;

D. reading a received sequence number from said received purge marker frame;

E. reading a received source address from said received purge marker frame;

F. determining whether said received source address is equal to the station address of the receiving station;

G. determining whether said received sequence number is equal to said current sequence number; and H. detecting a multiple token condition when
1. said received source address is equal to the station address the receiving station, and
2. said current sequence number is not equal to said received sequence number.

29. A method for purging a computer network, comprising the steps of:

A. capturing a token from the network;

B. transmitting one or more data frames onto the network in response to capturing said token;

C. incrementing a sequence number in response to capturing said token, to obtain a current sequence number;

D. transmitting at least one purge marker frame containing the station address of the transmitting station in the source address field, and said current sequence number, onto the network either after capture of said token or at the end of the transmission of said one or more data frames;

E. receiving at least one of said at least one purge marker frame from the network;

F. reading a received source address from a source address field of said received purge marker frame;

G. reading a received sequence number from said received purge marker frame;

H. determining whether said received source address is equal to the station address of the receiving station;

I. determining whether said received sequence number is equal to said current sequence number only if said received source address is equal to the station address of the receiving station;

J. stripping from the network all frames and remnants of frames received, except a token or a purge marker frame not containing the station address of the receiving statiaon in the source address field of said received purge marker frame, after said token is captured and before either an error-free purge marker frame or a token is received;

K. detecting a multiple token condition in response to:

1. determining that said received sequence number and said current sequence number are not equal; or
2. capturing a second token before at least one of said at least one purge marker frame containing the station address of the receiving station in the source address field of said purge marker frame is received;

L. counting the number of times a multiple token condition is detected; and

M. performing a ring initialization if the number of times the multiple token condition is detected exceeds a pre-determined value.

30. The station of claim 9, said second comparison means determining whether said received sequence number is equal to said current sequence only if said received source address is equal to the station address of the station, dependent claim on claim 9.

31. A station for a token-ring, said station comprising:
A. detecting means for detecting a network initialization;
B. hello frame originating means, responsive to said detecting means, for periodically transmitting purger hello frames containing a source address equal to the station address of said station onto the network in response to a network initialization;
C. purger hello frame receiving means for receiving a received purger hello frame;
D. comparison means, responsive to said purger hello frame receiving means, for comparing the source address contained in said received purger hello frame and the station address of said station;
E. means, responsive to said comparison means, for refraining from originating purger hello frames if the address in the detected purger hello frame has a predetermined numerical relationship to the station address of said station; and
F. means, responsive to said detecting means and said comparison means, for becoming a purging station in response to a ring re-initialization, and for remaining a purging station until said station receives a purger hello frame containing a source address which as said predetermined numerical relationship to the station address of said station.

32. The network of claim 15, said purging means stripping from the network all frames and remnants of frames received, except a token or a purge marker frame containing the station address of another station in the source address field of said purge marker frame, after said token is captured and before an error-free purge marker frame or a second token is captured by said token capturing means.

33. The station as in claim 19, further comprising:
A. means for periodically transmitting a purger hello frame having a current sequence;
B. means for receiving a received purger hello frame; and
C. means for determining if said received purger hello frame were transmitted by said purging station and is of said current sequence, and if it is not, said purging station ceasing to be a purging station.

34. The station as in claim 19, wherein said station was not a purging station, further comprising:
A. means for receiving a purger hello frame transmitted by said purging station; and
B. means for re-initializing said ring in the event that said purger hello frame is not received within a predetermined time period.

35. A method for electing a purging station on a network, comprising the steps of:
A. detecting a network initialization by a station on said network;
B. setting a purger election timer in said station;
C. periodically transmitting candidate hello frames from said station, said candidate hello frames containing a source address equal to the station address of said station onto the network;
D. receiving a received candidate hello frame by said station from said network;
E. comparing the source address contained in said received candidate hello frame and the station address of said station;
F. disabling said candidate hello frame transmitting of said candidate hello frames if the source address in said received candidate hello frame is numerically lower than the station address of said station; and
G. declaring said station a network purging station if said purger election timer expires before a candidate hello frame with a lower source address than the station address of said station is received by said station.

36. The method of claim 35, further comprising:
A. periodically transmitting a purger hello frame having a current sequence; and
B. receiving a received purger hello frame; and
C. determining if said received purger hello frame were transmitted by said purging station and is of said current sequence, and if it is not, said purging station ceasing to be a purging station.

37. The method of claim 35, wherein said station was not a purging station, further comprising:
A. receiving a purger hello frame transmitted by said purging station; and
B. re-initializing said ring in the event that said purger hello frame is not received within a predetermined time period.

38. The station as in claim 33, further comprising:
A. a current sequence number register;
B. means (132) for including the station address of said station in the source address field of said periodically transmitted purger hello frame;
C. means (132) for including the contents of said current sequence number register in said periodically transmitted purger hello frame as said current sequence;
D. a purger id register;
E. means (144), responsive to said means for receiving a received purger hello frame, for initializing the contents of said purger id register to a predetermined number, and for initializing said current sequence number register to a predetermined value, upon receipt of said received purger hello frame;
F. means (148) for receiving a second received purger hello frame;
G. a first comparison means (152) for determining whether the contents of said purger id register is equal to said predetermined value; and
H. means (154, 156), responsive to said means for receiving a second received purger hello frame and said first comparison means, for storing the contents of the source address field of said second received purger hello frame in said purger id register, and storing the current sequence of said second received purger hello frame in said current sequence number register, upon receipt of said second received purger hello frame, when the contents of said purger id register is equal to said predetermined value.

39. The station of claim 38, further comprising:
A. a second comparison means (160), responsive to said first comparison means (152) indicating said purger id value is equal to said predetermined value, for determining whether the contents of the source address field in said second received purger hello frame is lower than the station address of said station; and
B. means (154, 156), responsive to said second comparison means (160) indicating that the source address field in said second received purger hello frame is lower than the station address of said station, for storing the contents of the source address field of said second received purger hello frame in said purger id register, and storing the current sequence of said second received purger hello frame in said current sequence number register.

40. The station of claim 34, further comprising:
A. said means (146, 150, 151) for re-initializing said ring having a purger hello received timer, said purger hello received timer expiring said predetermined time period after being started or reset, said means for re-initializing said ring re-initializing said ring upon expiration of said purger hello frame received timer;
B. means (146), responsive to said means for receiving a purger hello frame transmitted by said purging station, for starting said purger hello received timer upon receipt of said received purger hello frame;
C. means (148) for receiving a second received purger hello frame;
D. means (158), responsive to said means for receiving a second purger hello frame, for resetting said purger hello received timer upon receipt of said second received purger hello frame.

41. The station of claim 40, further comprising:
A. comparison means (160), responsive to said means for receiving a second received purger hello frame, for determining whether the source address of said second received purger hello frame is lower than the station address of said station; and
B. means (158), responsive to said comparison means, for resetting said purger hello received timer only when the source address of said second received purger hello frame is lower than the station address of said station.

42. The method of claim 36, further comprising:
A. including (132) the station address of said station in the source address field of said periodically transmitted purger hello frame;
B. including (132) the contents of a current sequence number register in said periodically transmitted purger hello frame as said current sequence;
C. initializing (144) the contents of a purger id register to a predetermined number and initializing (144) said current sequence number register to a predetermined value, upon receipt of said received purger hello frame;
D. receiving (148) a second received purger hello frame; and
E. determining (152) whether the contents of said purger id register is equal to said predetermined value;
F. storing (154) the contents of the source address field of said second received purger hello frame in said purger id register, and storing (156) the current sequence of said second received purger hello frame in said current sequence number register, when said second received purger hello frame is received and the contents of said purger id register is equal to said predetermined value.

43. The method of claim 42, further comprising:
A. determining (160) if the contents of the source address field in said second received purger hello frame is lower than the contents of said purger id register when the contents of said purger id register is not equal to said predetermined value;
B. storing (154) the contents of the source address field of said second received purger hello frame in said purger id register, and storing (156) the current sequence of said second received purger hello frame in said current sequence number register, when said second received purger hello frame is received, and the contents of the source address field in said second received purger hello frame is lower than the contents of said purger id register.

44. The method of claim 35, further comprising:
A. starting (146) a purger hello received timer when said purger hello frame is received;
B. receiving (148) a second received purger hello frame;
C. resetting (158) said purger hello received timer upon receipt of said second purger hello frame;
D. said purger hello received timer expiring said predetermined time period after being started or reset; and
E. re-initializing (151) said ring upon expiration of a purger hello received timer.

45. The method of claim 44, further comprising:
A. determining (152) whether the contents of said purger id register is equal to said predetermined value;
B. determining (160) whether the source address of said second received purger hello frame is lower than the contents of purger id register; and
C. resetting (158) said purger hello received timer only when either the contents of said purger id register is equal to said predetermined value or the source address of said second received purger hello frame is lower than the contents of said purger id register.

46. A station on a network, said station comprising:
A. detecting means for detecting a network initialization;
B. means, responsive to said detecting means, for setting a purger election timer;
C. candidate hello frame transmitting means, responsive to said detecting means, for periodically transmitting candidate hello frames, said candidate hello frames containing the station address of said station;
D. candidate hello frame receiving means, for receiving a received candidate hello frame from said network;
E. a first comparison means, responsive to said candidate hello frame receiving means, for comparing the station address contained in said received candidate hello frame and the station address of said station;
F. means, responsive to said first comparison means, for disabling said candidate hello frame transmitting means to prevent said transmitting of said candidate hello frames if the station address in said received candidate hello frame is numerically lower than the station address of said station; and G. means for declaring said station a network purging station if said purger election timer expires before a candidate hello frame with a lower station address than the station address of said station is received by said station.

47. The station as in claim 19, further comprising:
A. means for receiving a purger hello frame transmitted by said purging station; and
B. means for re-initializing said ring in the event that said purger hello frame is not received within a predetermined time period.

48. A station for a token-ring network said station comprising:
A. a first detecting means (110) for detecting a network initialization;
B. a second detecting means (112), responsive to said first detecting means, for detecting whether said station was the claim token winner following a network initialization; and
C. means (130), responsive to said second detecting means indicating that said station was the claim token winner, for said station to become a purger station.

49. The station as in claim 48, further comprising:
purger hello frame transmitting means (132) for periodically transmitting purger hello frames.

50. The station as in claim 48, further comprising:
candidate hello frame transmitting means (116), responsive to said second detecting means (112) indicating that said station was not the claim token winner, for periodically (124) transmitting candidate hello frames.

51. The station of claim 50, further comprising:
A. token capturing means for capturing a token; and
B. purge marker frame transmitting means (114), responsive to said second detecting means indicating that said station was not the claim token winner, and responsive to said token capturing means capturing a token, for turning on purge mode (114) and for transmitting one or more purge marker frames in responsive to capture of a token.

52. The station as in claim 51, further comprising:
A. candidate hello frame receiving means (118) for receiving a received candidate hello frame;
B. comparison means (118), responsive to said candidate hello frame receiving means, for determining whether said received candidate hello frame contains an address lower than the station address of said station;
C. purger hello frame receiving means (120) for receiving a received purger hello frame, and providing indication when said received purger hello frame is received; and
D. means (122, 130), responsive to said candidate hello frame receiving means, said comparison means, and said purger hello frame receiving means, for becoming (130) a purger station when no received candidate hello frame with a lower address than the station address, and no received purger hello frame, is received within a predetermined time period.

53. The station as in claim 51, further comprising:
A. means for including the station address of said station in said one or more purge marker frames;
B. purge marker frame receiving means for receiving a received purge marker frame from said network;
C. comparison means (117), for comparing the station address in said received purge marker frame with the station address of said station; and
D. means (119) for ceasing to transmit purge marker frames when the station address in said received purge marker frame is not equal to the station address of said station.

54. The station of claim 2, said purging operation also ending upon capture of a second token by said token capturing means.

* * * * *